US008132753B2

(12) United States Patent
Taatjes et al.

(10) Patent No.: US 8,132,753 B2
(45) Date of Patent: Mar. 13, 2012

(54) FILAMENT SPOOL AND FILAMENT SPOOL CONTAINER, AND METHODS OF USE THEREOF

(75) Inventors: Thomas L. Taatjes, Eden Prairie, MN (US); Patrick W. Turley, Eden Prairie, MN (US); Martin G. Zalusky, Bloomington, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 13/079,244

(22) Filed: Apr. 4, 2011

(65) Prior Publication Data

US 2011/0174915 A1 Jul. 21, 2011

Related U.S. Application Data

(62) Division of application No. 12/255,808, filed on Oct. 22, 2008, now Pat. No. 7,938,356.

(51) Int. Cl.
*B65H 54/00* (2006.01)

(52) U.S. Cl. ...... 242/470; 252/580; 252/614; 252/125.3

(58) Field of Classification Search .................. 242/172, 242/174–176, 470, 476.1, 566, 579, 580, 242/587, 587.2, 587.3, 588, 588.3, 588.6, 242/614, 614.1, 125–125.3
See application file for complete search history.

(56) References Cited

U.S. PATENT DOCUMENTS

| D71,171 S | 4/1926 | Bonn |
| D79,201 S | 6/1928 | Mills |
| 1,906,495 A | 5/1933 | Stine |
| 3,358,943 A | 12/1967 | Ernest |
| D224,683 S | 8/1972 | Wada et al. |
| D228,789 S | 10/1973 | Koni |
| D230,703 S | 3/1974 | Nelson |
| D230,991 S | 3/1974 | Katto et al. |
| D233,411 S | 10/1974 | Geisler |
| D260,514 S | 9/1981 | Gell |
| 4,387,863 A | 6/1983 | Edmonston et al. |
| D276,527 S | 11/1984 | Flanigan |
| D282,357 S | 1/1986 | Gell |
| 4,657,203 A | 4/1987 | Crawford ................ 242/125.1 |
| 5,079,899 A | 1/1992 | Kurachi ........................ 53/399 |
| 5,106,066 A | 4/1992 | Shea et al. |
| 5,121,329 A | 6/1992 | Crump ......................... 364/468 |
| D343,319 S | 1/1994 | Phillips |

(Continued)

FOREIGN PATENT DOCUMENTS

DE 19909170 9/2000

(Continued)

OTHER PUBLICATIONS

International Search Report and Written Opinion of Application No. PCT/US2009/061257 filed on Oct. 20, 2009.

(Continued)

*Primary Examiner* — William E Dondero
(74) *Attorney, Agent, or Firm* — Brian R. Morrison; Westman, Champlin & Kelly, P.A.

(57) ABSTRACT

A filament spool for use in a filament spool container, where the filament spool comprises a first rim and a second rim offset by an axial shaft, and a series of grooves extending along a first portion of the first rim and configured to receive a filament of a material while the filament is wound around the axial shaft in a first rotational direction.

14 Claims, 15 Drawing Sheets

U.S. PATENT DOCUMENTS

| | | | |
|---|---|---|---|
| D346,379 S | 4/1994 | Patel et al. | |
| 5,340,433 A | 8/1994 | Crump | 156/578 |
| 5,362,008 A | 11/1994 | Nagel et al. | 242/417 |
| 5,503,785 A | 4/1996 | Crump et al. | 264/40.7 |
| D381,645 S | 7/1997 | Johnson | |
| 5,788,139 A | 8/1998 | Sikora | |
| D406,049 S | 2/1999 | Bernat | |
| D408,720 S | 4/1999 | Sheng | |
| 5,939,008 A | 8/1999 | Comb et al. | 264/308 |
| 5,968,561 A | 10/1999 | Batchelder et al. | 425/375 |
| 6,022,207 A | 2/2000 | Dahlin et al. | 425/145 |
| 6,027,068 A | 2/2000 | Lantsman | 242/564.4 |
| 6,070,107 A | 5/2000 | Lombardi et al. | 700/119 |
| 6,085,957 A | 7/2000 | Zinniel et al. | 226/8 |
| D436,021 S | 1/2001 | Arnold | |
| D436,111 S | 1/2001 | Hahn et al. | D14/475 |
| 6,228,923 B1 | 5/2001 | Lombardi et al. | 524/425 |
| D470,498 S | 2/2003 | Argumedo et al. | |
| D474,191 S | 5/2003 | Nakayama | |
| 6,685,866 B2 | 2/2004 | Swanson et al. | 264/308 |
| 6,715,710 B1 | 4/2004 | Russell et al. | |
| 6,722,872 B1 | 4/2004 | Swanson et al. | 425/225 |
| D491,048 S | 6/2004 | Cornier et al. | |
| 6,776,602 B2 | 8/2004 | Swanson et al. | 425/376.1 |
| 6,790,403 B1 | 9/2004 | Priedeman, Jr. et al. | 264/442 |
| D504,307 S | 4/2005 | Dayan | |
| 6,991,197 B2 | 1/2006 | Cox et al. | |
| 7,063,285 B1 | 6/2006 | Turley et al. | 242/171 |
| 7,066,425 B2 | 6/2006 | Cornier et al. | |
| 7,169,337 B2 | 1/2007 | Swanson et al. | 264/39 |
| D557,118 S | 12/2007 | Linginfelter | |
| 7,341,214 B2 | 3/2008 | Taatjes et al. | 242/170 |
| 7,384,255 B2 | 6/2008 | LaBossiere et al. | 425/190 |
| D595,121 S | 6/2009 | Murphy | |
| D598,733 S | 8/2009 | Taatjes et al. | |
| D598,922 S | 8/2009 | Taatjes et al. | |
| D606,845 S | 12/2009 | Taatjes et al. | |
| D606,998 S | 12/2009 | Taatjes et al. | |
| 7,996,101 B2 | 8/2011 | Menchik et al. | |
| 2004/0129823 A1 | 7/2004 | Swanson et al. | |
| 2006/0076454 A1 | 4/2006 | Kawada | 242/600 |
| 2007/0001050 A1 | 1/2007 | Taatjes et al. | |
| 2007/0228590 A1 | 10/2007 | LaBossiere et al. | 264/40.1 |
| 2009/0050732 A1 | 2/2009 | Ishikawa | |

FOREIGN PATENT DOCUMENTS

| | | |
|---|---|---|
| FR | 2902681 A1 | 12/2007 |
| GB | 551992 A | 3/1943 |
| GB | 2079247 A | 1/1982 |
| GB | 2438394 A | 11/2007 |

OTHER PUBLICATIONS

International Search Report and Written Opinion of Application No. PCT/US2009/061252 filed Oct. 20, 2009.

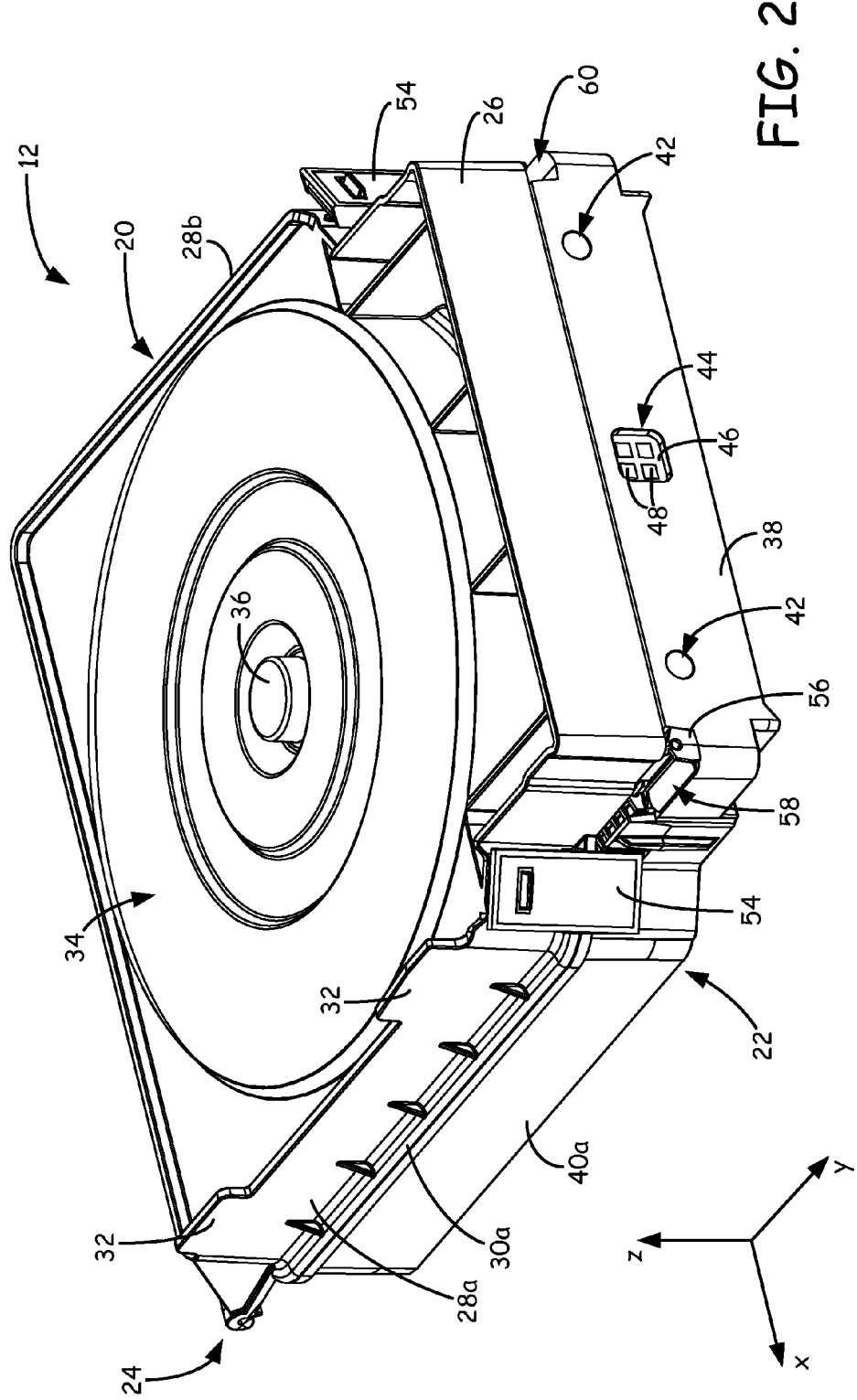

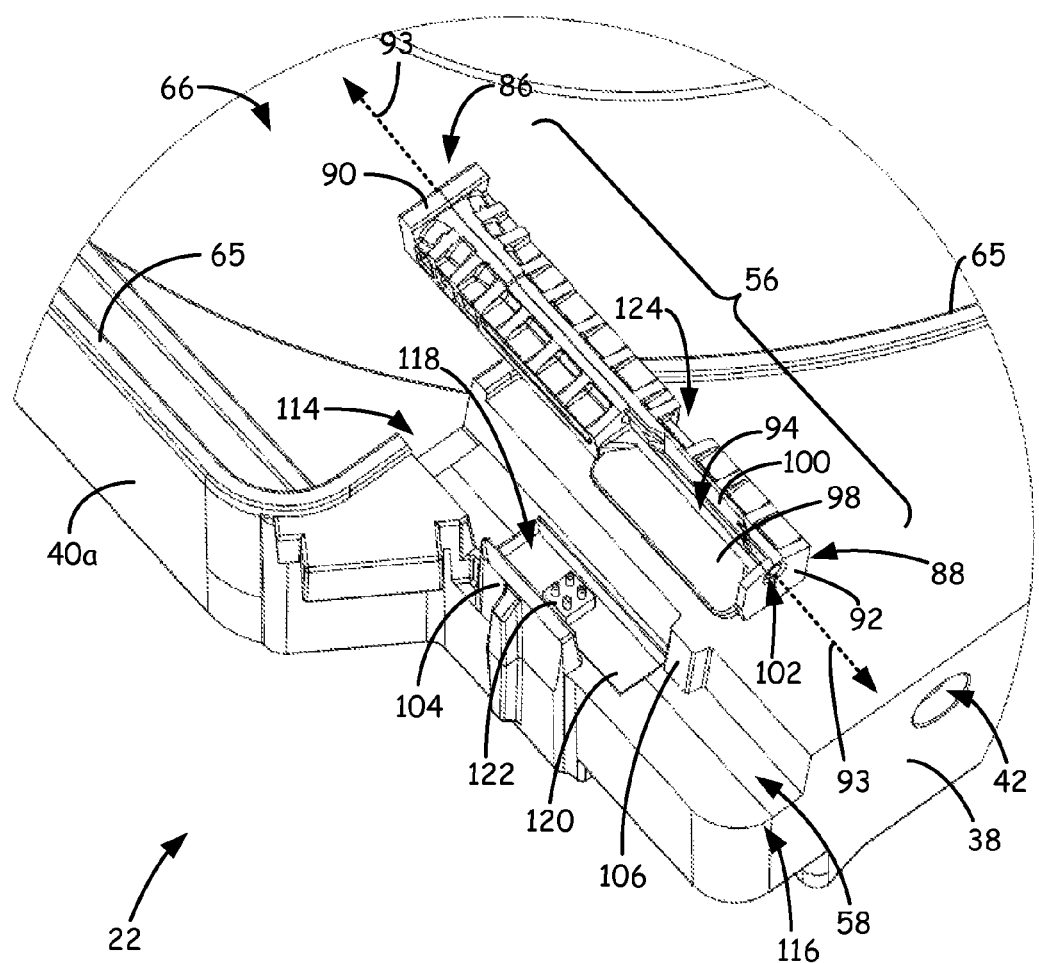
FIG. 8
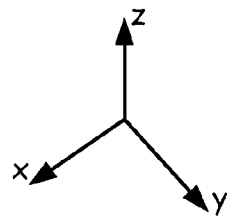

FILAMENT SPOOL AND FILAMENT SPOOL CONTAINER, AND METHODS OF USE THEREOF

CROSS-REFERENCE TO RELATED APPLICATION(S)

This application is a division of U.S. patent application Ser. No. 12/255,808, filed on Oct. 22, 2008, and entitled "FILAMENT SPOOL", the disclosure of which is incorporated by reference in its entirety.

Reference is hereby made to U.S. patent application Ser. No. 12/255,811, filed on Oct. 22, 2008, and entitled "FILAMENT GUIDE MECHANISM FOR FILAMENT SPOOL CONTAINER", the disclosure of which is incorporated by reference in its entirety.

Reference is also hereby made to U.S. Design patent application Ser. No. 29/378,539, filed on Nov. 5, 2010, and entitled "FILAMENT SPOOL"; which is a division of U.S. Design patent application Ser. No. 29/363,024, filed on Jun. 3, 2010, entitled "FILAMENT SPOOL", and which issued as U.S. Design Pat. No. D628,466; which is a division of U.S. Design patent application Ser. No. 29/351,230, filed on Dec. 2, 2009, entitled "FILAMENT SPOOL", and which issued as U.S. Design Pat. No. 618,086; which is a division of U.S. Design patent application Ser. No. 29/340,131, filed on Jul. 14, 2009, entitled "FILAMENT SPOOL", and which issued as U.S. Design Pat. No. D606,845; and which is a division of U.S. Design patent application Ser. No. 29/326,639, filed on Oct. 22, 2008, entitled "FILAMENT SPOOL", and which issued as U.S. Design Pat. No. D598,733.

Reference is also hereby made to U.S. Design patent application Ser. No. 29/384,419, filed on Jan. 21, 2011, and entitled "FILAMENT SPOOL CONTAINER"; which is a division of U.S. Design patent application Ser. No. 29/351,229, filed on Dec. 2, 2009, and is entitled "FILAMENT SPOOL CONTAINER"; which is a division of U.S. Design patent application Ser. No. 29/340,132, filed on Jul. 14, 2009, entitled "FILAMENT SPOOL CONTAINER", and which issued as U.S. Design Pat. No. D606,998; which is a division of U.S. Design patent application Ser. No. 29/326,638, filed on Oct. 22, 2008, entitled "FILAMENT SPOOL CONTAINER", and which issued as U.S. Design Pat. No. D598,922.

BACKGROUND

The present invention relates to digital manufacturing systems for building three-dimensional (3D) models. In particular, the present invention relates to assemblies and methods for providing filament feedstock to digital manufacturing systems, such as extrusion-based digital manufacturing systems.

An extrusion-based digital manufacturing system (e.g., fused deposition modeling systems developed by Stratasys, Inc., Eden Prairie, Minn.) is used to build a 3D model from a digital representation of the 3D model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Support material is then deposited from a second nozzle pursuant to the generated geometry during the build process. The support material adheres to the modeling material during fabrication, and is removable from the completed 3D model when the build process is complete.

SUMMARY

An aspect of the disclosure is directed to a method for supplying a filament of a material to a digital manufacturing system. The method includes loading a container to the digital manufacturing system, the container comprising an interior chamber and a channel extending from the interior chamber to an exterior surface of the container, where the filament is located in the interior chamber and extends at least partially through the channel. The method also includes detecting the presence of the filament at a first location in the channel with a sensor within the channel, and communicating between the sensor located within the channel and the digital manufacturing system while the container is loaded to the digital manufacturing system. The method further includes engaging a drive wheel of the digital manufacturing system with the filament in the channel at a second location that is downstream along the channel from the sensor, and rotating the drive wheel of the digital manufacturing system in a first rotational direction to drive successive portions of the filament through the channel.

Another aspect of the disclosure is directed to a method for supplying a filament of a material to a digital manufacturing system. The method includes loading a supply of the filament into a container, where a leading edge of the filament extends through a filament guide mechanism, and where the filament guide mechanism includes a filament pathway and a sensor accessible to the filament pathway. The method also includes inserting the filament guide mechanism into an exit channel of the container, loading the container containing the spool to the digital manufacturing system, and detecting the presence of the filament in the filament pathway with the sensor. The method further includes communicating between the sensor and the digital manufacturing system while the container is loaded to the digital manufacturing system.

A further aspect of the disclosure is directed to a method for loading a filament onto a filament spool for use in a digital manufacturing system. The method includes winding a first segment of the filament around an axial shaft of the filament spool in a first rotational direction, where the axial shaft is disposed between a first rim and a second rim, the first rim extending perpendicular to the axial shaft and comprising an inner side adjacent to the axial shaft, an outer side opposite of inner side, and a lateral edge offsetting the inner side and the outer side. The method also includes extending a second segment of the filament in the first rotational direction from the inner side of the first rim, across a lateral groove extending from the inner side of the first rim to the outer side of the first rim, such that at least a portion of the second segment is inserted through the lateral groove. The method further includes extending a third segment of the filament across the outer side of the first rim through at least one groove in the outer side of the first rim such that at least a portion of the third segment has an arcuate arrangement with a curve in the same direction as the first rotational direction, and restraining part of the third segment of the filament to the outer side of the first rim to maintain the arcuate arrangement.

BRIEF DESCRIPTION OF THE DRAWINGS

FIG. 2 is a top perspective view of a filament spool container for use with a
support filament.

FIG. 8 is an expanded perspective view of the filament guide mechanism disposed above the channel of the base housing.

DETAILED DESCRIPTION

Figure 1A:
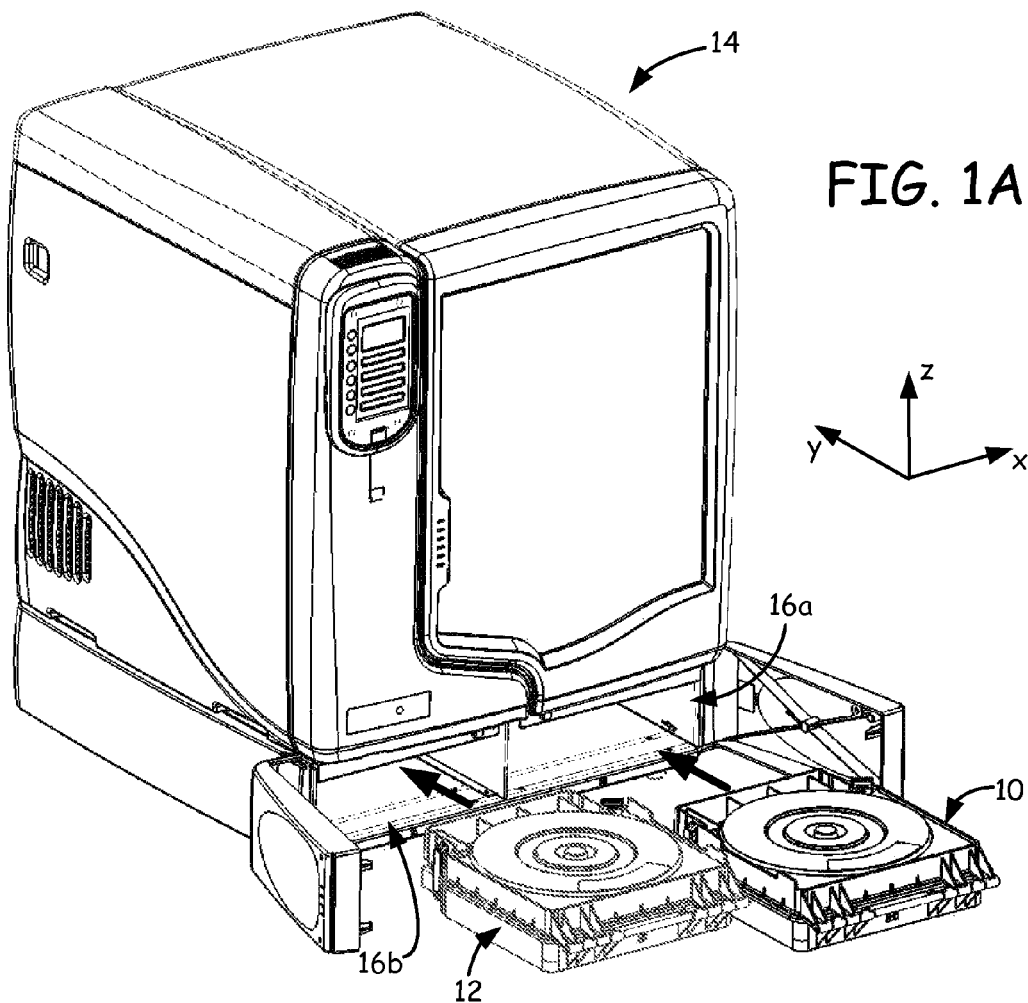
FIG. 1A is a perspective view of filament spool containers in use with a digital manufacturing system.

FIG. 1A illustrates filament supply containers 10 and 12 in use with system 14, where system 14 is a digital manufacturing system for building 3D models and corresponding support structures in a layer-by-layer manner. Suitable digital manufacturing systems for system 14 include fused deposition modeling systems developed by Stratasys, Inc., Eden Prairie, Minn. Containers 10 and 12 are spooled containers for respectively supplying a modeling material and a support material to system 14, where system 14 uses the modeling material to build a 3D model and the support material to build the support structure for the 3D model. As discussed below, containers 10 and 12 are particularly suitable for supplying the modeling and support materials in filament forms (referred to herein as a "modeling filament" and a "support filament").

Figure 1B:
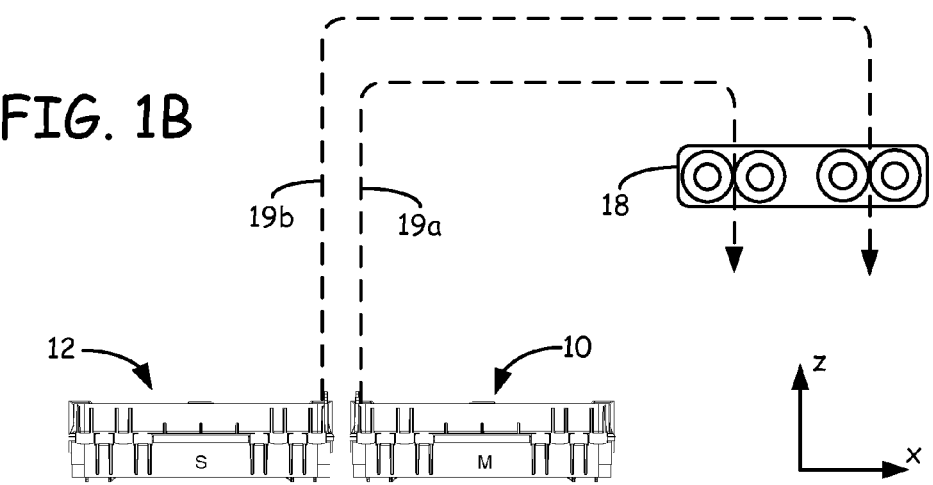
FIG. 1B is a front schematic illustration of the filament spool containers in use
with a drive mechanism of the digital manufacturing system.

Prior to a build operation, containers 10 and 12 are respectively inserted into loading bays 16a and 16b of system 14, and the modeling and support filaments are fed from containers 10 and 12 to one or more deposition heads (not shown) of system 14. As shown in FIG. 1B, which is a simplified schematic illustration of the filament feed pathways within system 14, the modeling filament may be fed from container 12 to drive mechanism 18 via pathway 19a, and the support filament may be fed from container 12 to drive mechanism 18 via pathway 19b. Accordingly, in this embodiment, the modeling and support filaments may be initially driven from containers 10 and 12 with one or more drive wheels (not shown in FIGS. 1A and 1B) located in loading bays 16a and 16b. This desirably drives the modeling and support filaments to drive mechanism 18 via pathways 19a and 19b, respectively. Drive mechanism 18 is desirably a filament drive mechanism located within system 14, such as one or more sets of drive wheels located at the deposition head(s). Examples of suitable filament drive mechanisms for drive mechanism 18 include those disclosed in Swanson et al., U.S. Pat. No. 7,169,337; LaBossiere et al, U.S. Pat. No. 7,384,255; and LaBossiere et al, U.S. Patent Application Publication No. 2007/0228590.

While forming layers of the 3D model, drive mechanism 18 may pull successive portions of the modeling filament from container 10 to the deposition head(s) via pathway 19a, where the modeling filament is melted and deposited onto a build platform (not shown) within system 14. Similarly, while forming layers of the support structure, drive mechanism 18 may pull successive portions of the support filament from container 12 to the deposition head(s) via pathway 19b, where the support filament is melted and deposited onto the build platform within system 14. The modeling and support filaments may be intermittently fed from containers 10 and 12 to allow the layers of the 3D model and support structure to be formed in an alternating manner that typical for a layer-based, additive build operation.

As discussed below, each of containers 10 and 12 desirably includes a filament sensor (not shown in FIGS. 1A and 1B) configured to detect when the given container 10 or 12 exhausts its supply of modeling or support filament. When this occurs, the remaining filament may then be drawn back into the given container, thereby allowing an additional container 10 or 12 to then feed a modeling or support filament to system 14. Furthermore, containers 10 and 12 are also configured to be readily identifiable in design and operation to allow a user to distinguish which of container 10 and 12 provides the modeling filament and which provides the support filament. For example, as shown in FIGS. 1A and 1B, the dimensions of containers 10 and 12 are substantially mirror images, which physically prevents container 10 from being loaded into loading bay 16b, and physically prevents container 12 from being loaded into loading bay 16a. This reduces user confusion and prevents a user from accidentally interchanging containers 10 and 12 during a loading process.

When one or both of containers 10 and 12 exhaust their supplies of modeling and support filaments, containers 10 and 12 may be removed from loading bays 16a and 16b for storage. Thus, multiple containers 10 may be interchangeably loaded into loading bay 16a, and multiple containers 12 may be interchangeably loaded into loading bay 16b. In an alternative embodiment, system 14 may include additional loading bays (not shown), which allow multiple containers 10 and multiple containers 12 to be simultaneously loaded to system 14. In this embodiment, when container 10 exhausts its supply of modeling filament, the remaining modeling filament may be withdrawn back into container 10, and a second modeling filament may be fed to drive mechanism 18 from an additional container 10 to allow the build operation to continue without interruption. Similarly, when container 12 exhausts its supply of support filament, the remaining support filament may be withdrawn back into container 12, and a second support filament may be fed to drive mechanism 18 from an additional container 12.

Figure 3:
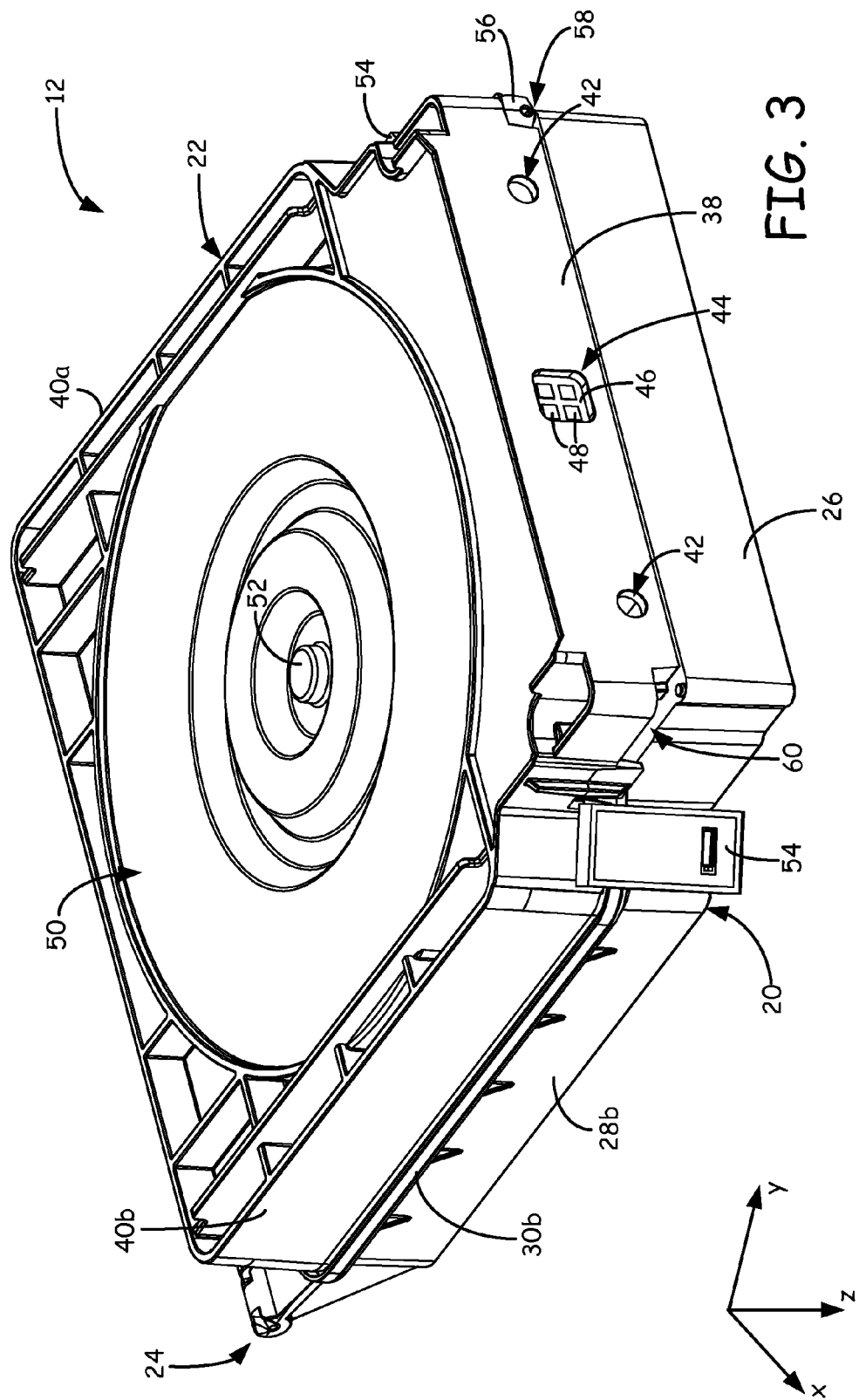
FIG. 3 is a bottom perspective view of the filament spool container.
Figure 4:
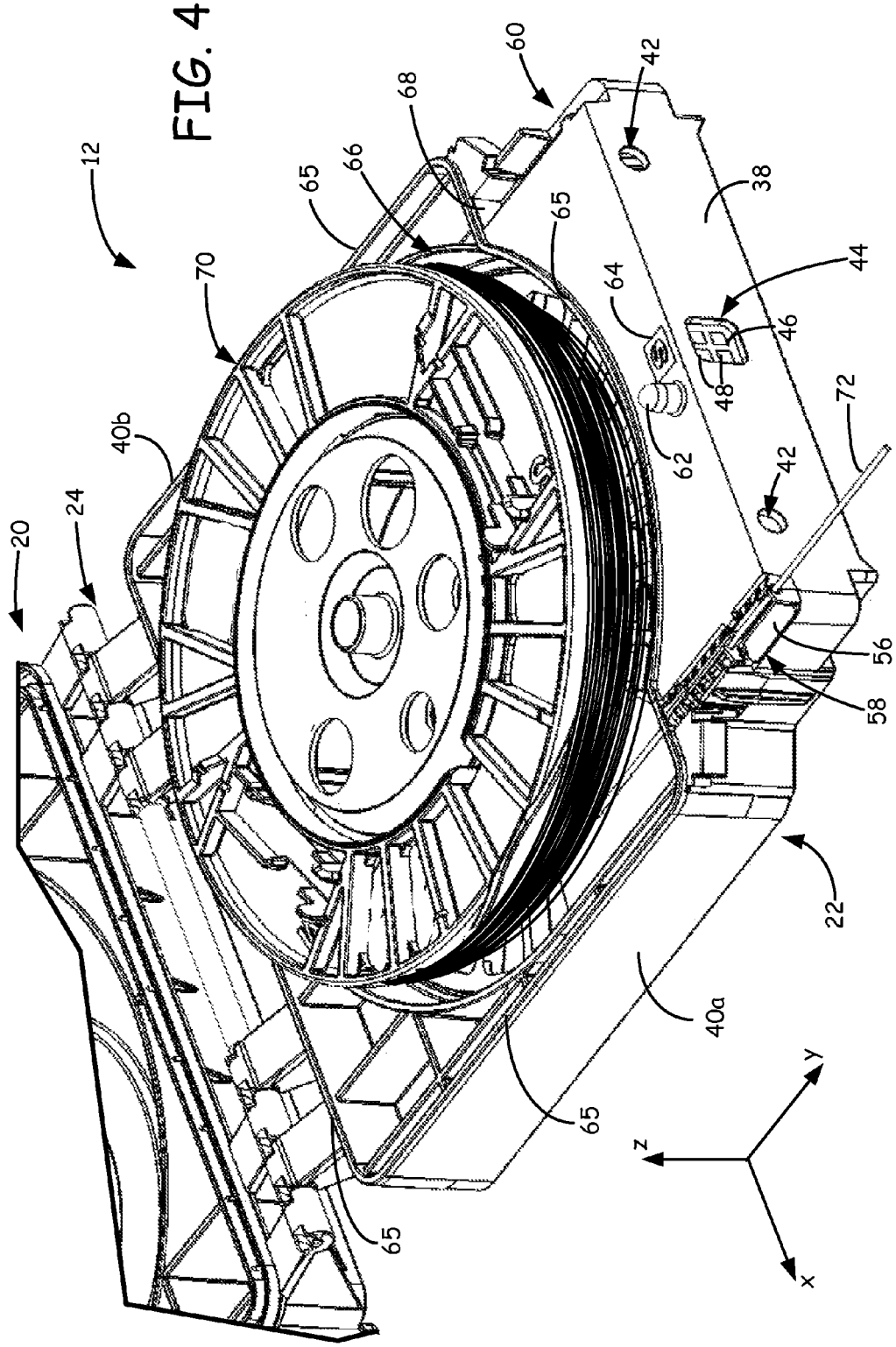
FIG. 4 is a top perspective view of the filament spool container in an open orientation, illustrating a filament spool disposed in a base housing of the filament spool container.
Figure 5:
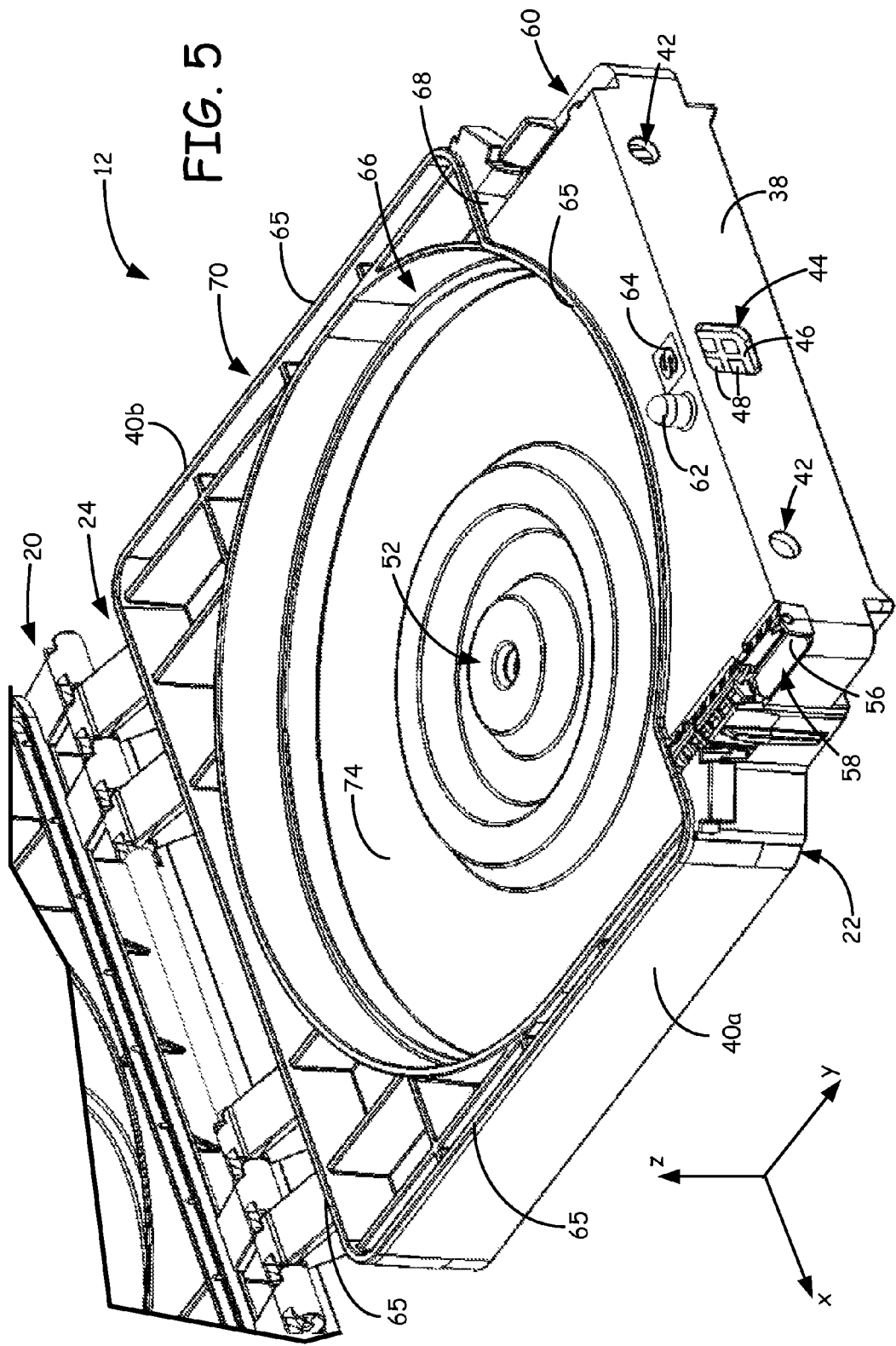
FIG. 5 is a top perspective view of the filament spool container in an open orientation with the filament spool omitted to further illustrate the base housing of the filament spool container.
Figure 6:
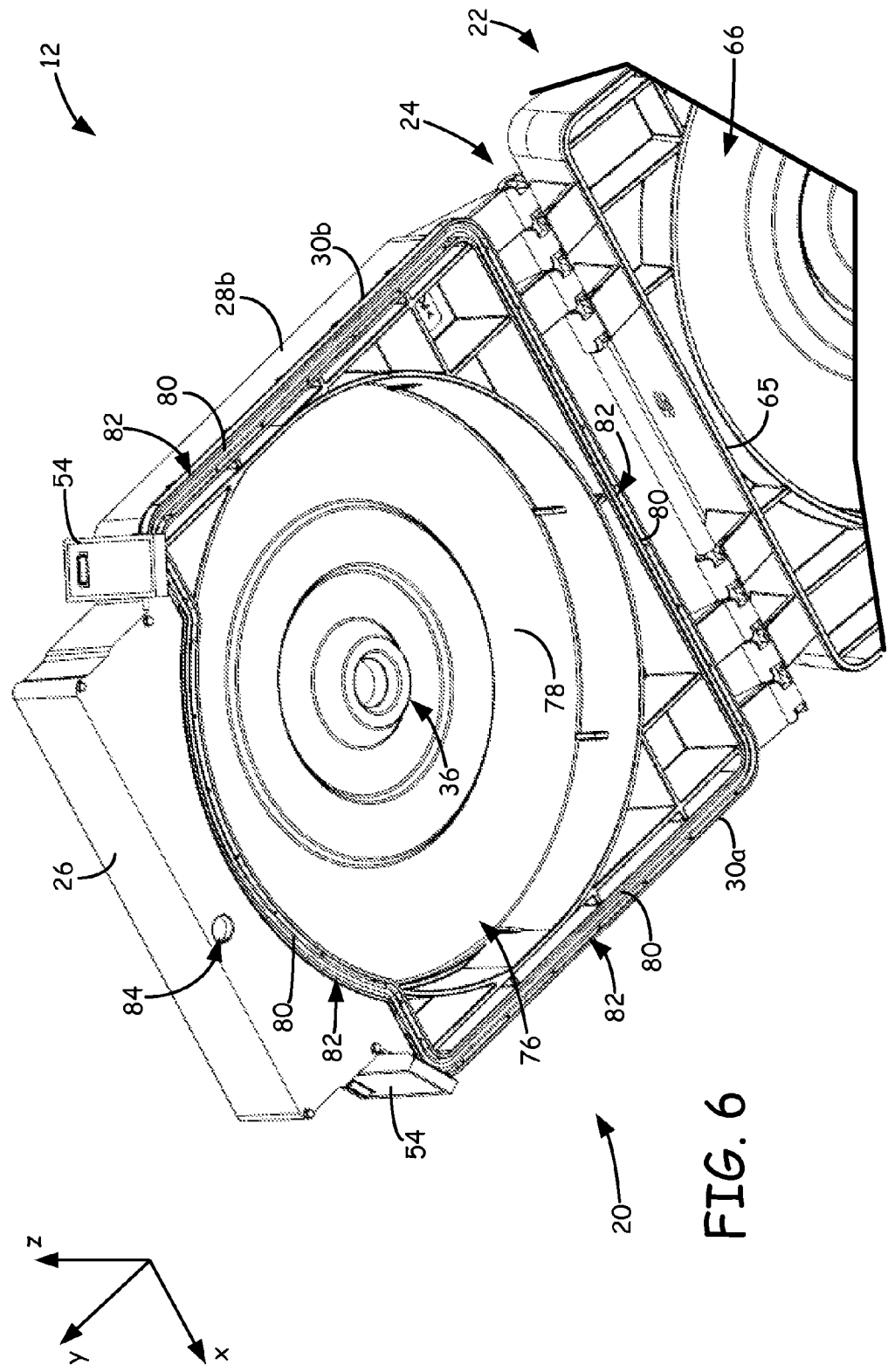
FIG. 6 is a bottom perspective view of the filament spool container in an open orientation, illustrating a cover housing of the filament spool container.

FIGS. 2 and 3 are top and bottom perspective views of container 12, respectively. While the following discussion is directed to container 12 for supplying a support filament, the discussion is also applicable to container 10 for supplying a modeling material, where the design of container 10 is desirably a substantial mirror image of container 12. As shown in FIG. 2, container 12 includes cover housing 20 and base housing 22, which are hingedly connected with hinge mechanism 24 to allow container 12 to be positioned between a closed orientation (as shown in FIGS. 2 and 3) and an open orientation (as shown in FIGS. 4-6).

Cover housing 20 is a first housing portion of container 12, and may be fabricated from one or more plastic or metal materials to desirably provide a rigid structure. In one embodiment, cover housing 20 is fabricated from a transparent or translucent material (e.g., a transparent or translucent plastic material). This allows a user to visually identify whether a spool is retained within container 12, and the type and amount of the support filament retained by the given spool. Cover housing 20 includes front surface 26 and lateral surfaces 28a and 28b, where front surface 26 is the exterior surface of cover housing 20 that faces system 14 (shown in FIG. 1A) when container 12 is loaded into loading bay 16b (shown in FIG. 1A).

Lateral surfaces 28a and 28b are the opposing exterior side surfaces of cover housing 20. As shown, lateral surfaces 28a and 28b respectively include reinforced rim 30a and reinforced rim 30b (shown in FIG. 3), which desirably provide a sealing engagement with base housing 22. Lateral surface 28a also includes fins 32, which, in the shown embodiment, extend in a substantially coplanar manner from lateral surface 28a, and align with a reciprocating slot (not shown) in loading bay 16b of system 14. Loading bay 16a of system 14 also includes a reciprocating slot (not shown) that aligns with the fins of container 10, where the fins of container 10 are substantial mirror images of fins 32 of container 12 (i.e., on the right side of container 10). This arrangement allows containers 10 and 12 to be respectively inserted into loading bays 16a and 16b, while also preventing container 10 from being inserted into loading bay 16a, and preventing container 12 from being inserted into loading bay 16b. As discussed above, this reduces user confusion, and prevents a user from accidentally interchanging containers 10 and 12 during a loading process.

Cover housing 20 also includes top surface 34 that is desirably shaped to allow a spool (not shown in FIGS. 2 and 3) to be rotatably retained within container 12. For example, top surface 34 may include hub mount 36 configured to retain a hub of the spool in a low-friction manner while restricting the spool from pivoting around its rotational axis. Top surface 34 may also include indicia, such as labels and engravings to provide a variety of textual and graphical information. As used herein, terms referring to directions of orientation (e.g., top, bottom, front, and lateral) are used for ease of discussion and are not intended to be limiting on any required directional orientations for containers 10 and 12.

Base housing 22 is a second housing portion of container 12, and may also be fabricated from one or more plastic or metal materials to desirably provide a rigid structure. Base housing 22 includes front surface 38, lateral surface 40a, and lateral surface 40b (shown in FIG. 3), where front surface 38 is the exterior surface of base housing 22 that faces system 14 when container 12 is loaded into loading bay 16b. As shown in FIGS. 2 and 3, front surfaces 26 and 38 are desirably flush when container 12 is in a closed orientation, thereby providing a substantially planar surface for engagement with loading bay 16b.

As further shown, front surface 38 includes alignment holes 42 for aligning container 12 with corresponding pins (not shown) in loading bay 16b (loading bay 16a may also include corresponding pins for container 10). In alternative embodiments, alignment holes (e.g., alignment holes 42) may be located at a variety of different locations on front surface 26 and/or front surface 38, or may be omitted. Front surface 38 also includes recessed opening 44, which provides access to circuit board 46. Circuit board 46 is desirably secured within base housing 22, and includes a plurality of electrical contacts 48 for transmitting signals to and from a controller (not shown) of system 14. This allows container 12 to communicate with system 14 for sending and receiving information relating to a variety of processing conditions, such as the type and amount of support filament remaining in container 12 and drive motor operations. In alternative embodiments, one or both of recessed opening 44 and circuit board 46 may be located at different locations on front surface 26 and/or front surface 38. Furthermore, circuit board 46 may be replaced with a variety of different electrical connection interfaces and/or wireless communication mechanisms for communicating with system 14.

Lateral surfaces 40a and 40b are the opposing exterior side surfaces of base housing 22, and respectively engage reinforced rims 30a and 30b of cover housing 20 to provide a sealing engagement when container 12 is in the closed orientation. As shown in FIG. 3, base portion 22 also includes bottom surface 50, which is also desirably shaped to allow a spool to be rotatably retained within container 12. For example, bottom surface 50 may include hub mount 52, which is also configured to retain a hub of the spool in a low-friction manner while also restricting the spool from pivoting around its rotational axis. As discussed below, the low-friction engagement between container 12 and the spool is beneficial to reduce the risk of the disrupting or otherwise restricting the movement of the support filament from container 12. Bottom surface 50 may also include indicia, such as labels and engravings to provide a variety of textual and graphical information.

Container 12 also includes buckle locks 54, which are locking mechanisms configured to secure cover housing 20 to base housing 22 for retaining container 12 in a closed orientation. In the embodiment shown, buckle locks 54 are located generally on the opposing end of container 12 from hinge mechanism 24. In alternative embodiments, a variety of different locking mechanisms may be used to secure cover housing 20 to base housing 22, where the locking mechanisms may be located at different locations along container 12. The use of buckle locks 54 at the shown locations of container 12 is beneficial for providing a tight seal around the perimeter of container 12, while also preventing buckle locks 54 from interfering with the engagement between container 12 and system 14.

Container 12 also includes filament guide mechanism 56 retained within channel 58. Channel 58 is an opening extending from the exterior surface of container 12 (e.g., front surface 38) to an interior chamber (not shown in FIGS. 1 and 2) defined by cover housing 20 and base housing 22. In the shown embodiment, channel 58 is formed as a recess in base housing 22. However, in alternative embodiments, channel 58 may be formed as a recess in cover housing 20, or as recesses in each of cover housing 20 and base housing 22.

Filament guide mechanism 56 is a component that may be removably mounted within channel 58, and desirably provides multiple functions for feeding the support filament to system 14. As discussed below, filament guide mechanism 56 may provide a filament pathway for guiding the support filament from the interior chamber of container 12. Furthermore, filament guide mechanism 56 may also provide a sensor for detecting the presence of the support filament within the filament pathway, and may provide information relating to the type and amount of support filament remaining within container 12. This allows container 12 to communicate with system 14 via circuit board 46 to transmit such information in real time to system 14 while container 12 is loaded in loading bay 16b.

On the opposing side of container 12 from channel 58, container 12 also includes channel 60, which is an extra channel between cover housing 20 and base housing 22. Channel 60 desirably has dimensions that are the substantial mirror image of channel 58, and is the location of a channel in container 10 for retaining a filament guide mechanism for the modeling filament. As discussed below, in one embodiment, the spools containing the support filament and the modeling filament desirably wind the given filaments in opposing rotational directions. This allows the support filament to be fed from container 12 through channel 58 with the use of filament guide mechanism 56. Correspondingly, this arrangement allows the modeling filament to be fed from container 10 through a filament guide mechanism (not shown) that is removably mounted in the location of channel 60. The opposing rotational wind directions for the modeling and support filaments reduces the risk of undesirably using a modeling filament spool in container 12 and using a support filament spool in container 10. The symmetry of channels 58 and 60 allows a single container to be molded for each of containers 10 and 12, where channel 58 extends through to the interior chamber, as discussed below.

FIGS. 4 and 5 show container 12 in an open orientation, further illustrating base housing 22. As shown in FIG. 4, base housing 22 further includes alignment peg 62, which aligns with a hole (not shown in FIG. 4) within cover housing 20 for aligning cover housing 20 with base housing 22 while container 12 is in the closed orientation. For identification purposes, base housing 22 may also include indicia (e.g., indicia 64) and color identifiers. In one embodiment, one or more portions of hinge mechanism 24 may also be doped with a colorant to visually distinguish container 12 from container 10. While container 12 is inserted in loading bay 16b, hinge mechanism 24 is one of the portions of container 12 that is visible to a user (when the door of loading bay 16b is open). Thus, providing one or more color identifiers on hinge mechanism 24 allows a user to visually distinguish containers 10 and 12 while inserted in loadings 16 and 18. Furthermore, filament guide mechanism 56 may also be colored to allow a user to readily identify which of channels 58 and 60 that filament guide mechanism 56 may be inserted into. In one embodiment, various components of container 12 (e.g., hinge mechanism 24 and filament guide mechanism 56) include the same color identifiers to allow a user to readily identify that the various components belong to the same container (e.g., container 12).

As further shown in FIG. 4, base housing 22 includes seal trim 65, which extends laterally around cavity portion 66 and the ribbed structured of base housing 22. Seal trim 65 provides a sealing engagement with cover housing 20 when container 12 is in the closed orientation. Base housing 22 desirably includes a ribbed structure (as shown in FIG. 4) that provides structural support for base housing 22, and also provides suitable locations for the placement of desiccant packages. The use of desiccants is beneficial for reducing the moisture content in the support filament during storage and transportation. Furthermore, a comparison of channels 58 and 60 show that channel 60 includes wall portion 68, which is desirably flush with seal trim 65. Wall portion 68 prevents access between channel 60 and the interior chamber of base portion 22 and assists in providing a sealing engagement between cover housing 20 and base housing 22. For container 10 (shown in FIGS. 1A and 1B), channel 58 desirably includes wall portion 68, and channel 60 desirably extends through to the interior chamber of container 10 for feeding the modeling filament.

Cavity portion 66 is the portion of base housing 22 in which spool 70 may be rotatably mounted. Spool 70 is an example of a suitable filament spool for use with container 12, and includes a supply of support filament 72. In alternative embodiments, a variety of different filament spools can be used with container 12 for feeding support filament 72 to system 14. Examples of suitable alternative filament spools include those disclosed in Dahlin et al., U.S. Pat. No. 6,022,207 and Swanson et al., U.S. Pat. No. 6,776,602. However, as discussed below, spool 70 is particularly suitable for use with container 12 for supplying support filament 72 to system 14.

Support filament 72 may compositionally include a variety of different support materials. Examples of suitable materials for support filament 72 include water-soluble support materials commercially available under the trade designations "WATERWORKS" and "SOLUBLE SUPPORTS" from Stratasys, Inc., Eden Prairie, Minn.; and break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; and Priedeman et al, U.S. Pat. No. 6,790,403. Correspondingly, suitable modeling filaments for container 10 may also include a variety of different modeling materials. Examples of suitable modeling materials for a modeling filament for container 10 include thermoplastic materials, such as acrylonitrile-butadiene-styrene (ABS) copolymers, polycarbonates, polyphenylsulfones, modified variations thereof (e.g., ABS-M30 copolymers), and blends thereof.

Prior to use in system 14, container 12 may be opened to the orientation shown in FIG. 4 and spool 70 may be inserted into cavity portion 66. As discussed below, in one embodiment, filament guide mechanism 56 may be retained by spool 70 prior to use. In this embodiment, filament guide mechanism 56 may be removed from spool 70 and positioned in channel 58 of container 12. Filament 72 may be inserted through filament guide mechanism 56, as shown in FIG. 4, thereby allowing support filament 72 to be readily fed from container 12 to system 14. After spool 70 is mounted within cavity portion 66, cover housing 20 may be closed to base housing 22, and buckle lock 54 may be used to seal container 12 in the closed orientation. Container 12 may then be inserted into loading bay 16b of system 14 for feeding support filament 72 to system 14.

During a build operation, support filament 72 extends through filament guide tube 56, and is fed drive mechanism 18 of system 14 (shown in FIG. 1B) for use in depositing the support material to build a support structure. When container 12 is mounted within loading bay 16b of system 14, electrical contacts 48 of circuit board 46 desirably interface within system 14. This allows container 12 to communicate with system 14, thereby allowing a drive wheel (not shown in FIG. 4) to engage with filament guide mechanism 56 for feeding support filament 72 from container 12 to drive mechanism 18. The communication between container 12 and system 14 also allows system 14 to direct the operation of drive mechanism 18 based on signals relayed from container 12.

FIG. 5 shows base housing 22 in the same orientation as shown above for FIG. 4, where spool 70 is omitted for clarity. As shown in FIG. 5, base housing 22 includes cavity floor 74 in cavity portion 66, which is the opposing surface of bottom surface 50 (shown in FIG. 3) and also defines hub mount 52. As discussed above, hub mount 52 desirably defines a low-friction mount for retaining the bottom hub of spool 70, thereby allowing spool 70 to rotate freely within cavity portion 66 with low frictional resistance. The low-friction engagement between container 12 and spool 70 is beneficial to reduce the risk of the disrupting or otherwise restricting the movement of support filament 72 while feeding filament 72 from container 12.

FIG. 6 is a bottom perspective view of container 12 in an open orientation, further illustrating cover housing 20. As shown, cover housing 20 includes cavity portion 76, which is the opposing portion from cavity portion 66 of base housing 22 (shown in FIGS 4 and 5). Accordingly, cavity portions 66 and 76 define an interior chamber when container 12 is in a closed orientation, in which spool 70 (shown in FIG. 4) may be rotatably mounted. Cover housing 20 also includes cavity ceiling 78 in cavity portion 76, which is the opposing surface of top surface 34 (shown in FIG. 2) and also defines hub mount 36.

Cover housing 20 also includes gasket 80 disposed within track 82, where track 82 extends around cavity portion 76 of cover housing 20. Gasket 80 is desirably a ring derived of a sealant material (e.g., one or more elastomeric materials) to provide a sealing engagement with base housing 22 when container 12 is in a closed orientation. This further restricts access of air and moisture from entering container 12 while in the close orientation. The arrangement of gasket 80 and track 82 shown in FIG. 6 is desirable to provide an effective seal laterally around cavity portion 76.

Cover housing 22 also desirably includes a ribbed structure (as shown in FIG. 6) that provides structural support for cover housing 20, and also provides suitable locations for the placement of desiccant packages. As further shown, gasket 80 and track 82 extend around the ribbed structure of cover housing 20, thereby allowing any retained desiccant packages to be located within the seal provided by gasket 80. This allows the desiccant packages to absorb moisture from the interior chamber defined by cavity portions 68 and 76 when container 12 is in the closed orientation. In alternative embodiments, container 12 may attain gas and moisture seals using a variety of different seal mechanisms and designs. Cover housing 20 also includes hole 84 which is configured to receive alignment peg 62 of base housing 22 (shown in FIGS. 4 and 5) when container 12 is in the closed orientation.

Figure 7:
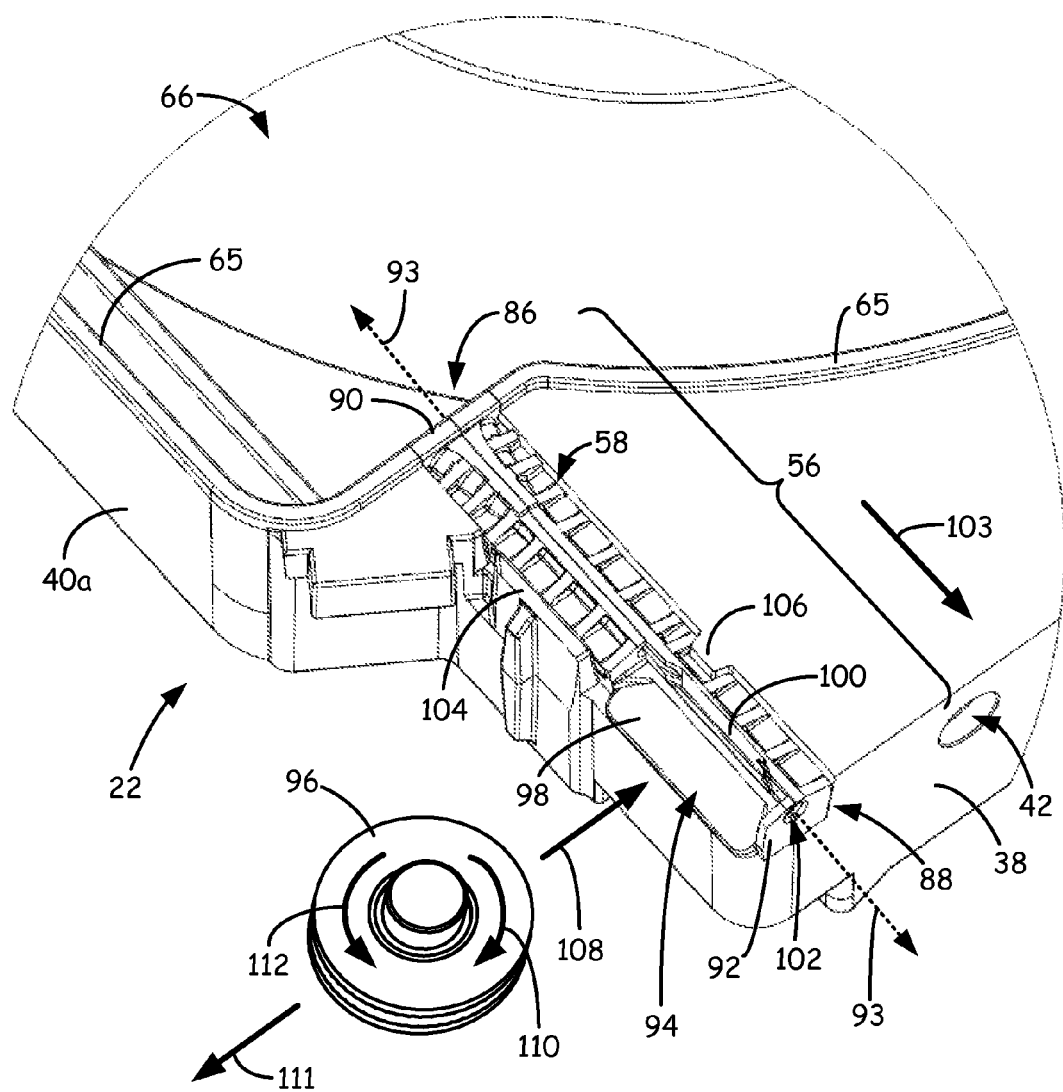
FIG. 7 is an expanded perspective view of a filament guide mechanism disposed in a channel of the base housing of the filament spool container.

FIG. 7 is an expanded perspective view of base housing 22, further illustrating filament guide mechanism 56 mounted in channel 58. As shown, filament guide mechanism 56 includes inlet end 86 and outlet end 88. While filament guide mechanism 56 is mounted in channel 58, inlet end 86 is disposed adjacent to cavity portion 66 and outlet end 88 is disposed adjacent to front surface 38. Filament guide mechanism 56 also includes trim portion 90 located at inlet end 86, which is desirably aligned and substantially flush with seal trim 65 while filament guide mechanism 56 is mounted in channel 58. This substantially preserves the sealing engagement between seal trim 65 and gasket 80 (shown in FIG. 6) when container 12 is in the closed orientation. In alternative embodiments, trim portion 90 may be located at different locations along filament guide mechanism 56 for alignment with seal trim 65. Filament guide mechanism 56 also includes face portion 92 located at outlet end 88, which is desirably substantially flush with front surface 38 of base housing 22.

Filament guide mechanism 56 defines a filament pathway extending from inlet end 86 to outlet end 88 along longitudinal axis 93. In the view shown in FIG. 7, the filament pathway passes engagement region 94, which is an open region of filament guide mechanism 56 at which a drive wheel of system 14 (referred to as drive wheel 96) engages support filament 72 (not shown in FIG. 7). At engagement region 94, filament guide mechanism 56 includes beveled surface 98 and bracing wall 100. Beveled surface 98 is a sloped surface configured to direct drive wheel 96 toward support filament 72, and bracing wall 100 is a surface for bearing support filament 72 while support filament 72 is engaged with drive wheel 96. Support wall 100 is desirably smooth to reduce frictional resistance while support filament 72 is driven through filament guide mechanism 56.

As further shown in FIG. 7, face portion 92 of filament guide mechanism 56 defines exit orifice 102 of the filament pathway. The downstream location of face portion 92 relative to engagement region 94 allows face portion 92 to guide support filament 72 toward system 14 after support filament 72 is driven by drive wheel 96. As used herein, the terms "downstream" and "upstream" are made with reference to the feed direction of a filament (e.g., support filament 72) through a filament guide mechanism (e.g., filament guide mechanism 56), as represented by arrow 103, where "downstream" is in the direction of arrow 103 and "upstream" is in the opposing direction of arrow 103.

Furthermore, base housing 22 also includes support wall 104 and extension member 106, which partially define channel 58. Support wall 104 is an exterior wall located upstream from engagement region 94, and extension member 106 is an member that extends into channel 58 from the interior portion of base housing 22. Support wall 104 and extension member 106 desirably have dimensions that assist in retaining filament guide mechanism 56 within channel 58 without interfering with engagement region 94.

During a build operation, support filament 72 is desirably pre-fed into the filament pathway of filament guide mechanism 56 at inlet end 86, through engagement region 94, and out of exit orifice 102. While support filament 72 extends through engagement region 94, drive wheel 96 may engage support filament 72. This may involve moving drive wheel 96 toward beveled surface 98 (as represented by arrow 108). When drive wheel 98 contacts beveled surface 98, the sloped angle of beveled surface 98 directs drive wheel 96 upward toward support filament 72. Accordingly, beveled surface 98 is capable of directing drive wheel 96 to a proper engagement with support filament 72, thereby allowing drive wheel 96 to grip support filament 72 with a desired pressure. Drive wheel 96 may then be rotated in the direction of arrow 110 to drive support filament 72 from container 12 to drive mechanism 18 via pathway 19b (shown in FIG. 1B). Drive mechanism 18 may then pull successive portions of support filament 72 from container 12 to the deposition head(s) of system 14. Thus, after initially driving support filament 72 into system 14 for engagement with the subsequent drive mechanism, drive wheel 96 disengage from container 12 by moving away from container 12 (as represented by arrow 111).

When the build operation is paused, drive mechanism 18 may be halted to prevent additional portions of support filament 72 from being driven. When container 12 depletes its supply of support filament 72, drive wheel 96 may reengage with container 12, and may be rotated in the opposing rotational direction (represented by arrow 112). This draws the remaining portion of support filament 72 back into container 12. As discussed below, this is particularly suitable for use with filament guide mechanism 56, which is capable of detecting when the supply of support filament 72 within container 12 is depleted.

As shown in FIG. 8, channel 58 includes interior end 114 and exterior end 116, where interior end 114 is located adjacent cavity region 66 and exterior end 116 is located adjacent front surface 38. Exterior end 116 of channel 58 desirably provides an exterior opening to allow engagement region 94 of filament guide mechanism 56 to be accessible to a drive wheel of system 14 (e.g., drive wheel 96).

As further shown in FIG. 8, channel 58 includes recessed opening 118 that contains circuit board 120. Circuit board 120 includes electrical contacts 122 (e.g., POGO pins), which are configured to engage with a reciprocating electrical interface on the bottom filament guide mechanism 56 (not shown). Circuit board 120 is also in signal communication with circuit board 46 (shown in FIGS. 2-5), thereby allowing signals sent from filament guide mechanism 56 to be relayed to circuit board 46. This allows system 14, which is in signal communication with circuit board 46 via electrical contacts 48, to receive information from filament guide mechanism 56. In alternative embodiments, the design and location of circuit board 120 may vary depending on the particular designs of filament guide mechanism 56 and channel 58.

The geometry of filament guide mechanism 56 also desirably defines indention 124, which mates with extension member 106 when filament guide mechanism 56 is mounted in channel 58. Accordingly, during installation, filament guide mechanism 56 may be inserted into channel 58 such that indention 124 mates with extension member 106, such that engagement region 94 is substantially accessible, and such that trim portion 90 is substantially flush with seal trim 65. When fully inserted into channel 58, filament guide mechanism 56 engages with electrical contacts 122, thereby placing filament guide mechanism 56 in signal communication with circuit board 46 of base housing 22. Support filament 72 may then be fed through filament guide mechanism 56, as discussed above.

Figure 9:
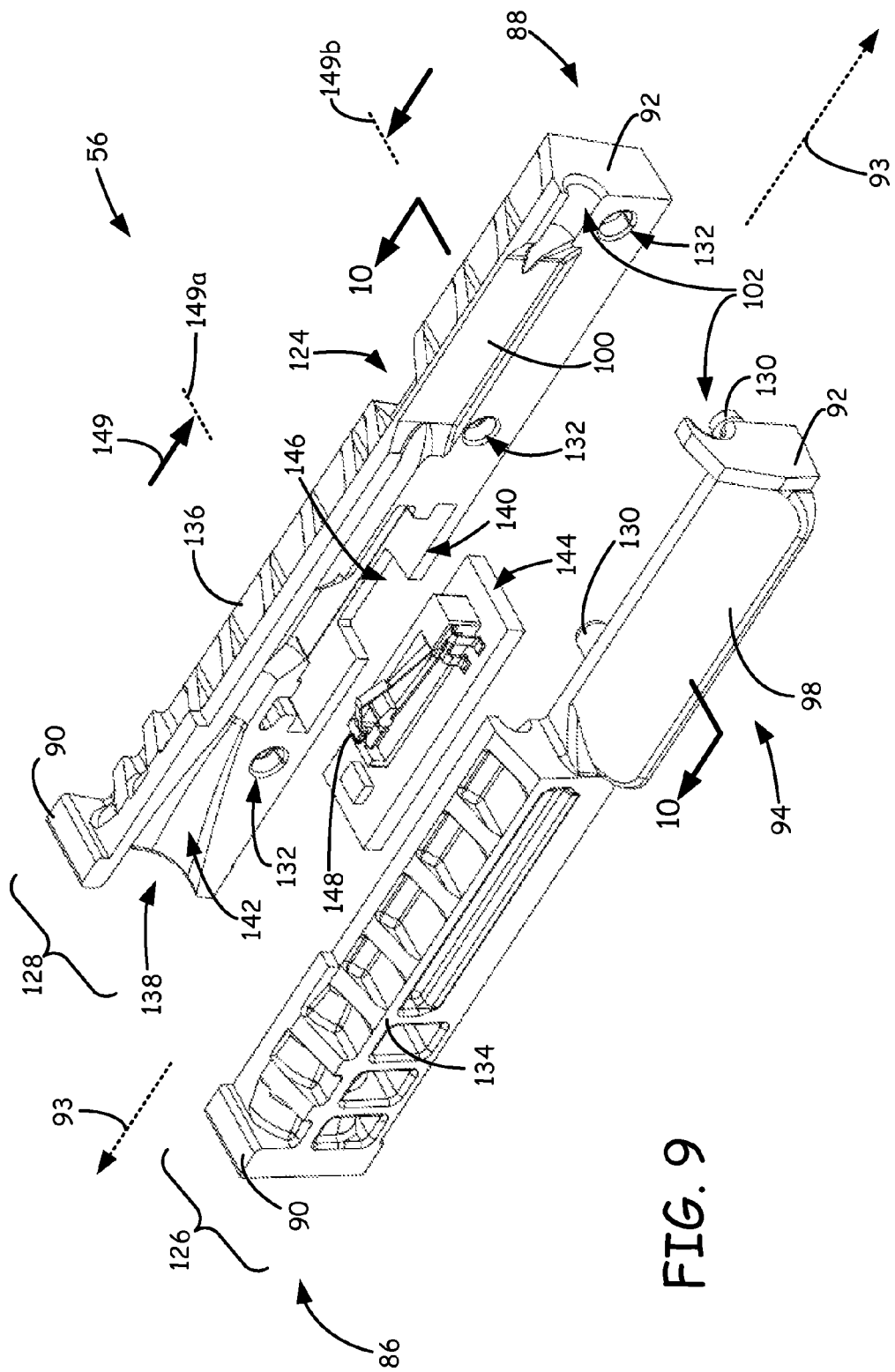
FIG. 9 is an exploded perspective view of the filament guide mechanism.

As shown in FIG. 9, the body of filament guide mechanism 56 may be fabricated as sections 126 and 128, which are first and second sections that may be injection molded from a variety of materials, such as plastics and metals, and desirably exhibit rigid structures. In the embodiment shown, sections 126 and 128 are secured together with the use of tabs 130 and receiving holes 132. In alternative embodiments, sections 126 and 128 may be secured together with the use of a variety of different mechanical and/or adhesive-based components.

Sections 126 and 128 include outer surfaces 134 and 136, respectively, which are desirably easy to grip for manually inserting filament guide mechanism 56 into channel 58. When secured together, sections 126 and 128 define filament pathway 138 and pocket 140, where filament pathway 138 extends from pathway entrance 142 at inlet end 86 to exit orifice 103 at outlet end 88 along longitudinal axis 93. Pathway entrance 142 is desirably a flared entrance to increase the ease of inserting support filament 72 into filament guide mechanism 56. Filament pathway 138 desirably has a diameter that is sufficient for guiding support filament 72 without excessive frictional resistance, while also reducing the ingress of moisture (e.g., water vapor). Suitable average diameters for filament pathways 138 may vary depending on the respective diameter of support filament 72. For example, for support filament 72 having an average filament diameter of about 1.78 millimeters (about 0.070 inches), suitable average inner diameters 62 for filament pathway 138 range from greater than about 1.78 millimeters (about 0.070 inches) to about 2.03 millimeters (about 0.080 inches), with particularly suitable average inner diameters ranging from about 1.83 millimeters (about 0.072 inches) to about 1.91 millimeters (about 0.075 inches).

As further shown, filament pathway 138 intersects pocket 140 and engagement region 94. As discussed above, engagement region 94 is a region that provides access to support filament 72 with an external drive wheel of system 14 (e.g., drive wheel 96) for driving successive portions of support filament 72 through filament guide mechanism 56. Pocket 140 is an interior region of the body of filament guide mechanism 56 for retaining circuit board 144, and includes base opening 146. This arrangement allows circuit board 144 to engage with electrical contacts 122 of circuit board 120 (shown in FIG. 8) through base opening 146. This correspondingly places circuit board 144 in signal communication with circuit boards 46 and 120.

Circuit board 144 desirably includes one or more components configured to monitor the progress of support filament 72 while support filament 72 is fed from container 12. In the embodiment shown in FIG. 9, circuit board 144 includes filament sensor 148, which is an actuating contact switch configured to identify when support filament 72 is present within filament guide mechanism 56. While support filament 72 extends through filament pathway 138, the portion of support filament 72 at pocket 140 depresses filament sensor 148 to a closed circuit state. This closed circuit state provides a signal to system 14 via circuit boards 46 and 120, thereby informing system 14 that support filament 72 is still present in container 12 and filament guide mechanism 56.

When the supply of support filament 72 is exhausted, the trailing end of support filament 72 passes beyond pocket 140, which releases pressure from filament sensor 148. This actuates filament sensor 148 to an open circuit state, which identifies that the trailing end of support filament 72 has been reached. This information is signaled to system 14 via circuit boards 46 and 120, thereby informing system 14 that the supply of support filament 72 in container 12 is exhausted. In alternative embodiments, filament sensor 148 may detect the presence of support filament through filament guide mechanism 56 using a variety of detection techniques.

Engagement region 94 is located downstream along longitudinal axis 93 from filament sensor by distance 149, where distance 149 is measured from a first contact point between filament sensor 148 and support filament 72 (referred to as contact point 149a) and a second contact point that is an average location along engagement region 94 at which the drive wheel (e.g., drive wheel 96) engages and grips support filament 72 (referred to as contact point 149b). The actual locations of contact points 149a and 149b along longitudinal axis 93 may vary by small amounts due to variations in the engagements between support filament 72 and filament sensor 148 and between support filament 72 and drive wheel 96.

Thus, distance 149 may be referred to as an average distance. Suitable average distances for distance 149 may vary depending on multiple factors, such as the feed rate of support filament 72, and may include any distance that provides a sufficient duration for system 14 to stop the rotation of drive wheel 96 prior to driving the trailing end of support filament 72 beyond engagement region 94. Examples of suitable average distances for distance 149 include distances of at least about 2.0 centimeters (about 0.8 inches), with particularly suitable average distances for distance 149 ranging from about 2.0 centimeters (about 0.8 inches) to about 10.0 centimeters (about 3.9 inches), and with even more particularly suitable average distances for distance 149 ranging from about 3.0 (about 1.2 inches) centimeters to about 5.0 centimeters (about 2.0 inches).

The downstream location of engagement region 94 relative to filament sensor 148 by distance 149 substantially prevents the trailing end of support filament 72 from completely exiting container 12, and allows drive wheel 96 to draw the remaining portion of support filament 72 back into container 12. This is beneficial for removing the remaining portion of support filament 72 from pathway 19b of system 14 (shown in FIG. 1B), thereby allowing an additional support filament to be supplied to system 14 when the supply of support filament 72 in container 12 is exhausted.

Accordingly, when filament sensor 148 no longer detects the presence of support filament 72 in pocket 140, system 14 is informed of this occurrence via circuit boards 46 and 120. System 14 then instructs drive mechanism 18 to stop pulling support filament 72 from container 12. As discussed above, filament sensor 148 is desirably separated from engagement region 94 by distance 149, which allows system 14 to stop the rotation of the drive mechanism prior to support filament being completely exhausted. System 14 may then direct drive wheel 96 to engage with the trailing end of support filament 72 that remains within filament pathway 138, and to rotate in the opposing rotational direction (i.e., in the direction of arrow 112, shown in FIG. 7) to draw the remaining portion of support filament 72 back into container 12. The drawback duration may vary depending on the amount of support filament 72 that needs to be drawn back into container 12, and may be based on a preset time interval. Accordingly, the driving and drawback of support filament 72 may be performed in an automated manner by system 14 based on the detection of support filament 72 within filament guide mechanism 56.

In one embodiment, filament sensor 148 may also verify that the drawback process functions properly. When drive wheel 96 draws the remaining portion of support filament 72 back into container 12, support filament 72 reenters pocket 140. At pocket 140, filament sensor 148 detects the presence of support filament 72 again, thereby identifying that support filament 72 is actually being drawn back into container 12. This identification may then be relayed to system 14 via circuit boards 46 and 120. However, in the event of a filament jam during the drawback process, support filament 72 may not be properly driven back into pocket 140. Thus, if filament sensor 148 does not detect the presence of support filament 72 within a set time period after the drawback process begins (e.g., one second), filament sensor 148 may inform system 14 of the potential filament jam via circuit boards 46 and 120. System 14 may then stop the rotation of drive wheel 96 and/or provide user notification about the potential jam.

In addition to providing filament detection, circuit board 144 may also include non-volatile media that store information relating to support filament 72. For example, the stored information may include data relating to the type of support material for support filament 72, the color of the support material for support filament 72, the amount of support material 72 remaining within container 12, and combinations thereof. With respect to the amount of support material 72 remaining within container 12, circuit board 144 may receive tracking information from system 14 relating to the amount of support filament 72 being passed through filament guide mechanism 56 (e.g., based on the drive rate of drive mechanism 18). This allows circuit board 144 to maintain an updated record on the amount of support filament 72 remaining within container 12. Furthermore, the stored information may include encryption data and driver protocols for allowing container 12 to communicate and function with system 14.

Figure 10:
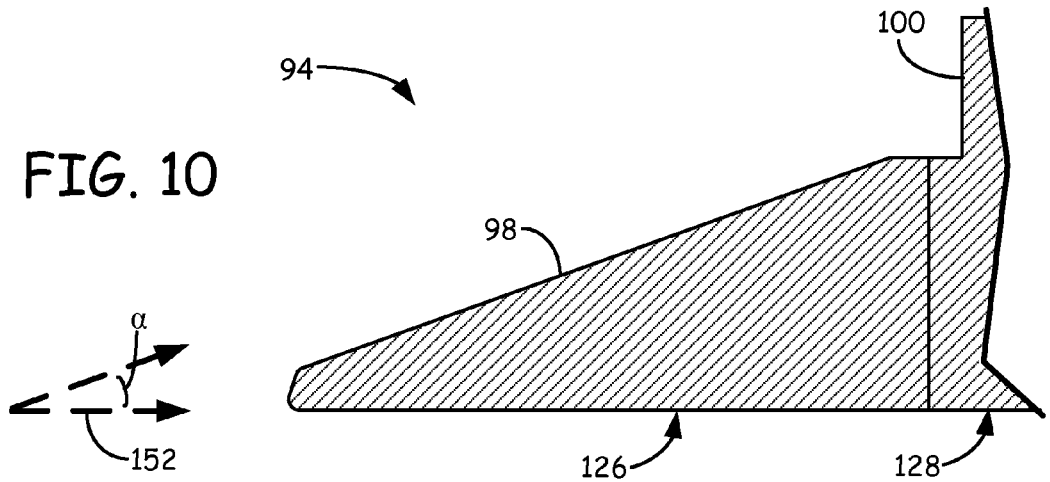
FIG. 10 is a sectional view of section 10-10 taken in FIG. 9, illustrating a beveled surface of the filament guide mechanism.

FIG. 10 is a sectional view of section 10-10 in FIG. 9, illustrating the slope angle of beveled surface 98 (referred to as slope angle α). Slope angle α is an average angle of beveled surface 98 relative to base line 152, where base line 152 is defined as a line that is orthogonal to bracing wall 100. As discussed above, beveled surface 98 is a sloped surface configured to direct drive wheel 96 toward support filament 72, where bracing wall 100 is a surface for bearing support filament 72 while support filament 72 is engaged with drive wheel 96. Examples of suitable average angles for slope angle α range from greater than zero degrees (i.e., non-orthogonal to bracing wall 100) to about sixty degrees, with particularly suitable average angles for slope angle α ranging from about thirty degrees to about forty-five degrees.

In the embodiment shown in FIG. 10, beveled surface 98 is substantially planar. In alternative embodiments, filament guide mechanism 56 may included non-planar beveled surfaces. In each of these embodiments, the slope for slope angle 150 is measured as the tangent to the curvature of the beveled surface. Accordingly, filament guide mechanism 56 may include beveled surfaces having a variety of different geometric designs for directing drive wheel 96 toward support filament 72.

Figure 11:
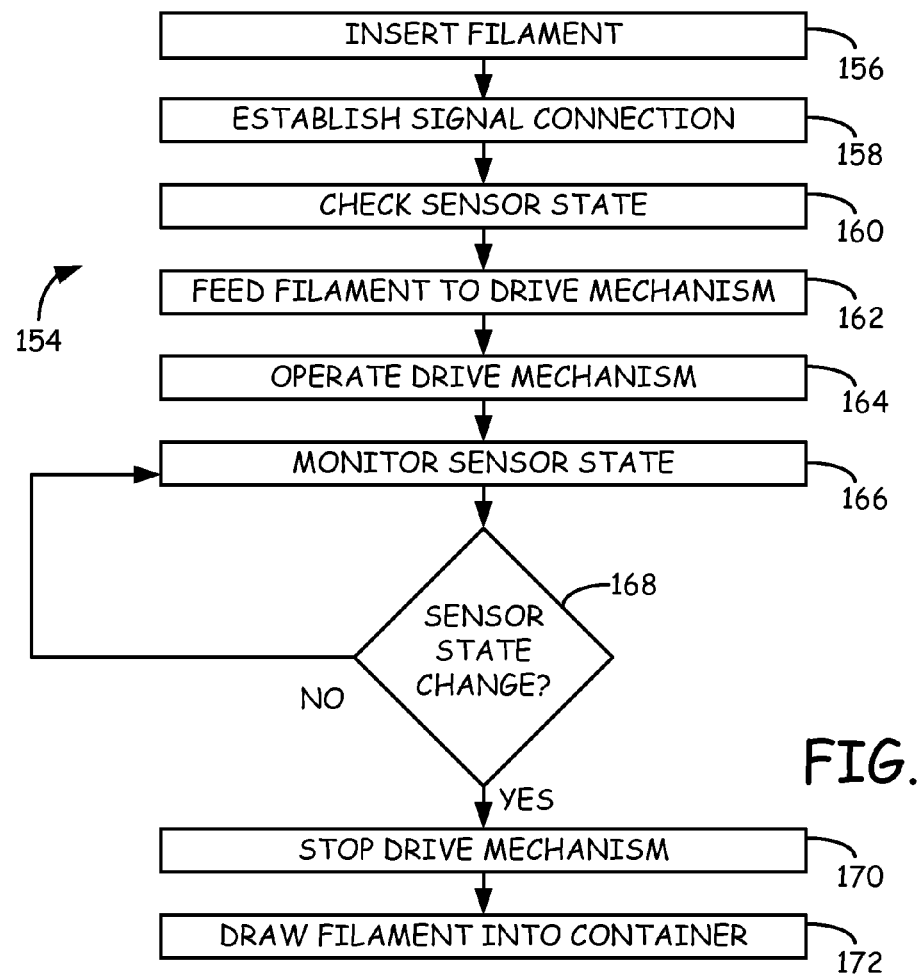
FIG. 11 is a flow diagram of a method for using the filament spool container with a digital manufacturing system.

As shown in FIG. 11, method 154 is a suitable method for operating each of containers 10 and 12 with system 14. The following discussion of method 154 is made with reference to container 12 and support filament 72. However, method 154 is also suitable for use with container 10 and a modeling filament in the same manner. Method 154 includes steps 156-172, and initially involves inserting support filament 72 into filament guide mechanism 56 (step 156). As discussed above, support filament 72 may be pre-inserted into filament guide mechanism 56 prior to storage and transportation. Thus step 156 may be performed by the user of system 14 and/or by the supplier of spool 70 and support filament 72.

When filament guide mechanism 56 is mounted in channel 58 of base housing 22, circuit board 144 of filament guide mechanism 56 is placed in signal communication with circuit board 120 of base housing 22, which is correspondingly in signal communication with circuit board 46 of base housing 22. When container 12 is loaded into loading bay 16b of system 14, circuit board 46 operably engages with a controller of system 14, thereby establishing a signal connection between circuit board 144 and system 14 (step 158). Power for the communication between system 14 and circuit board 144 may be supplied from system 14 through the electrical engagements of circuit boards 46, 120, and 144. In alternative embodiments, one or more components of container 12 may be powered with a portable power supply retained by container 12.

Inserting support filament 72 through filament pathway 138 of filament guide mechanism 56 causes filament sensor 148 to detect the presence of support filament 72. Thus, system 14 may initially check the state of filament sensor 148 to determine whether support filament 72 is present in filament guide mechanism 56 (step 160). Checking the state of filament sensor 148 may be performed in a variety of manners, such as receiving a signal from container 12 that filament sensor 148 is an a closed circuit state. System 14 may then begin or continue a build operation, and rotate drive wheel 96 to feed support filament 72 from container 12 to drive mechanism 18 (step 162). Drive wheel 96 may then disengage from container 12, and drive mechanism 18 may be operated to pull successive portions of support filament 72 from container 12 to the deposition head(s) (step 164). While feeding the successive portions of support filament 72, system 14 may continuously monitor the state of filament sensor 148 (step 166). During the monitoring, system 14 may detect whether there is a change in the state of filament sensor 148 (step 168). For example, system 14 may monitor whether there is a change in the circuit state of filament sensor 148 (e.g., switching from a closed circuit state to an open circuit state). If no change is detected, system 14 may continue to monitor the state of filament sensor 148 for state changes (steps 166 and 168).

When the trailing end of support filament 72 passes through pocket 140 of filament guide mechanism 56, filament sensor 148 detects the absence of support filament 72, and filament sensor 148 changes circuit states. System 14 accordingly detects this change and stops the operation of drive mechanism 18 (step 170). This prevents the trailing end of support filament 72 from exiting engagement region 94 of filament guide mechanism 56. Drive wheel 96 may then be reengaged with container 12 to draw the remaining portion of support filament 72 back into container 12, as discussed above (step 172). This allows an additional support filament to be fed to system 14 for continuing the build operation.

Figure 12:
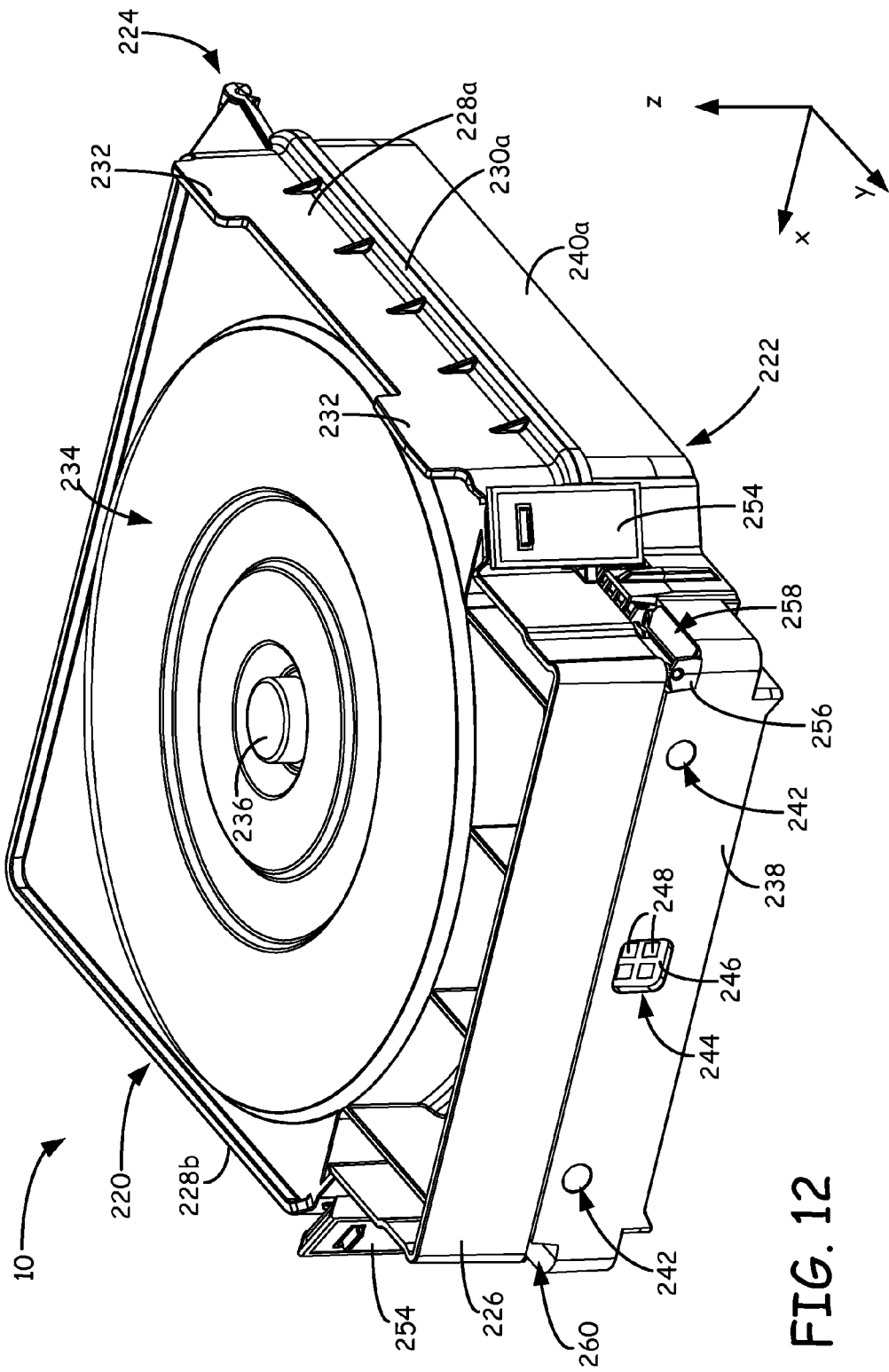
FIG. 12 is a top perspective view of a second filament spool container for use with a modeling filament.

FIG. 12 is a front perspective view of container 10, further illustrating the substantial mirror-image arrangement between containers 10 and 12. In the embodiment shown, container 10 is a substantial mirror image to container 12, where the corresponding reference labels are increased by "200". Accordingly, container 10 includes filament guide mechanism 256, which is mounted in a right-side channel 258 for directing a modeling filament from container 10. The respective channel 260 remains empty, and is desirably sealed off from the interior chamber of container 10 in the same manner as discussed above for channel 60. Thus, the modeling filament is fed from container 10 by rotating the spool of container 10 in an opposing rotational direction from that of spool 70. This further assists a user in distinguishing containers 10 and 12, and prevents containers 10 and 12 from being operated in their reciprocal loading bays of system 14.

Figure 13:
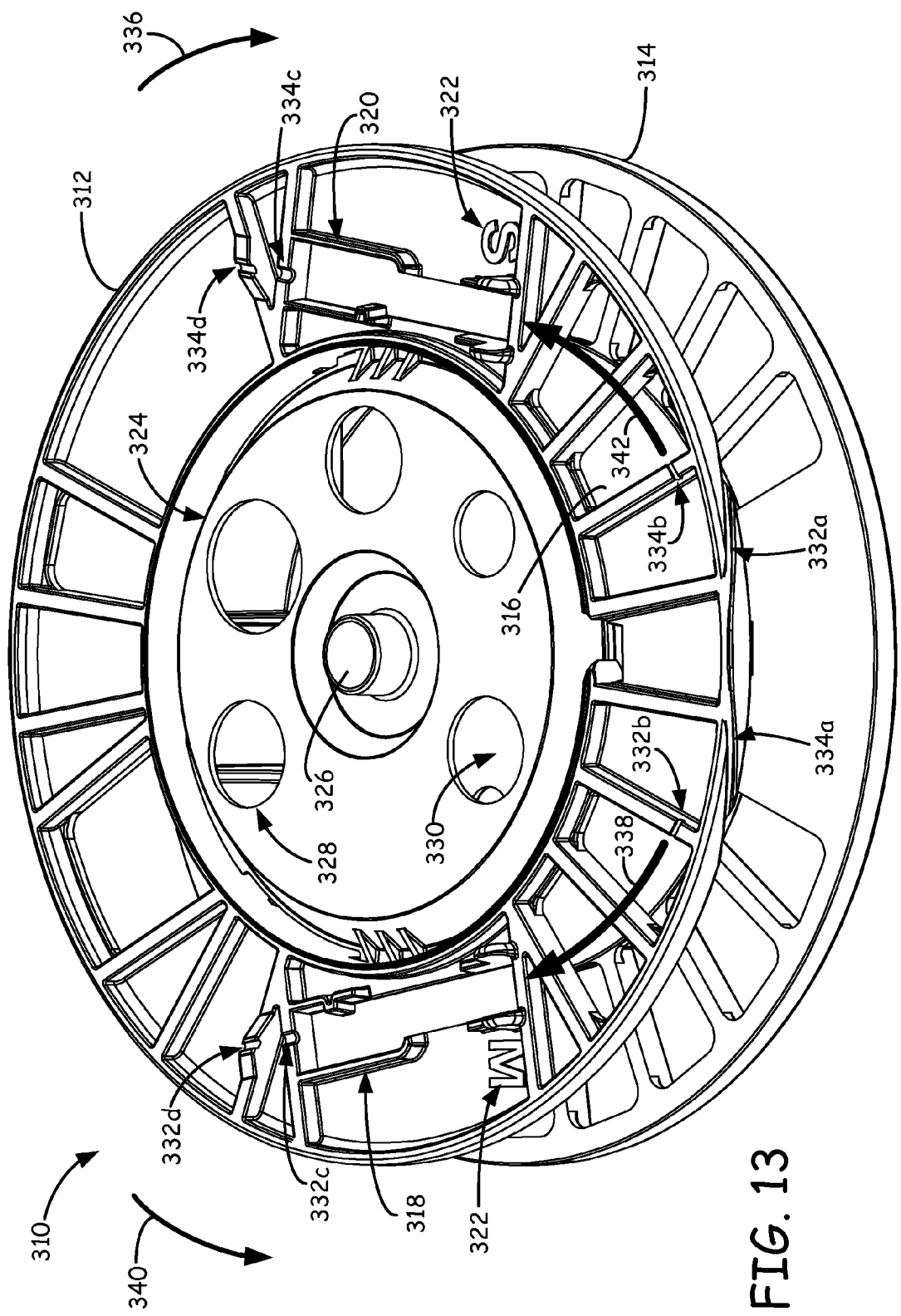
FIG. 13 is a top perspective view of a filament spool.
Figure 14:
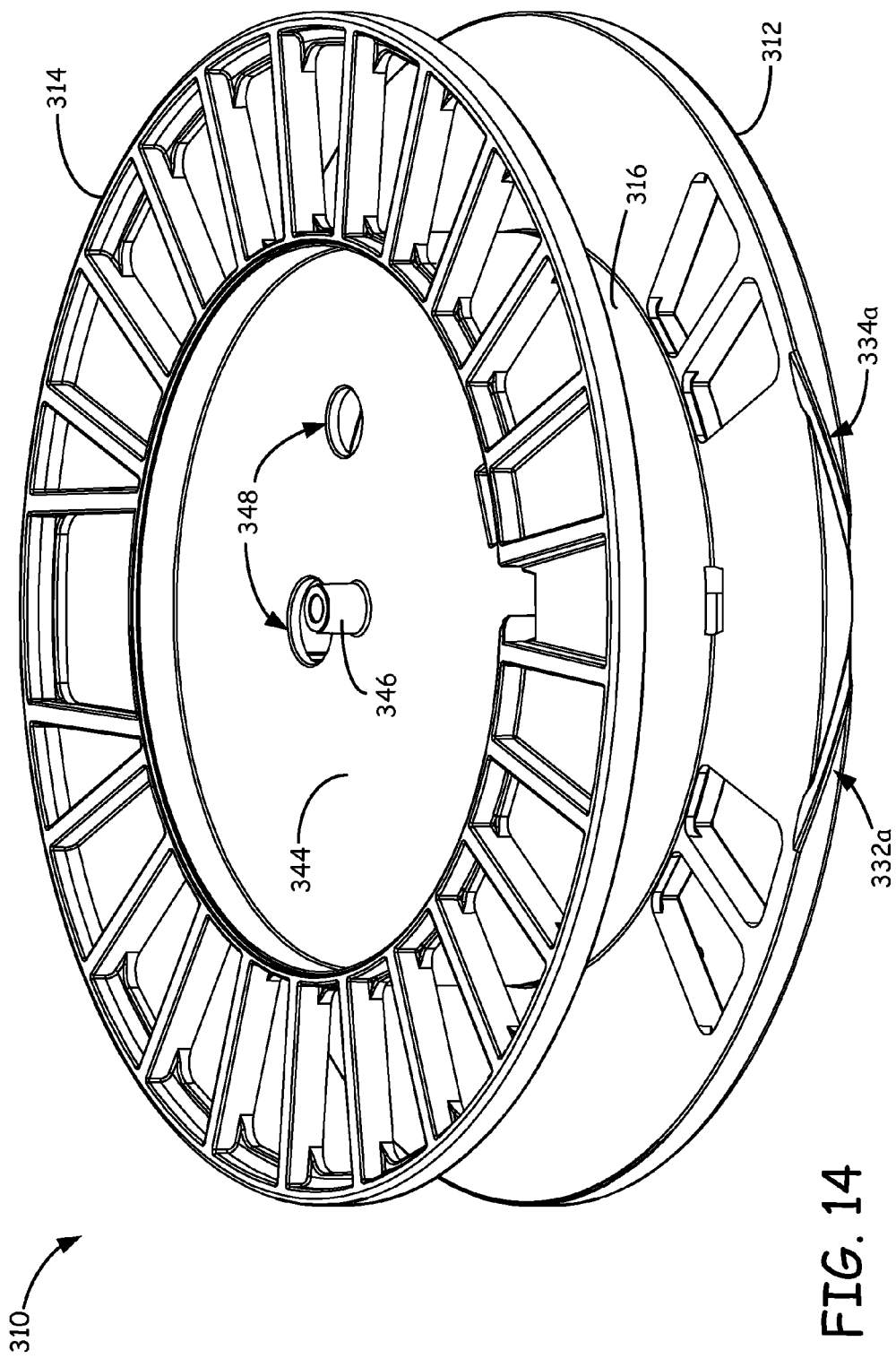
FIG. 14 is a bottom perspective view of the filament spool.
Figure 15:
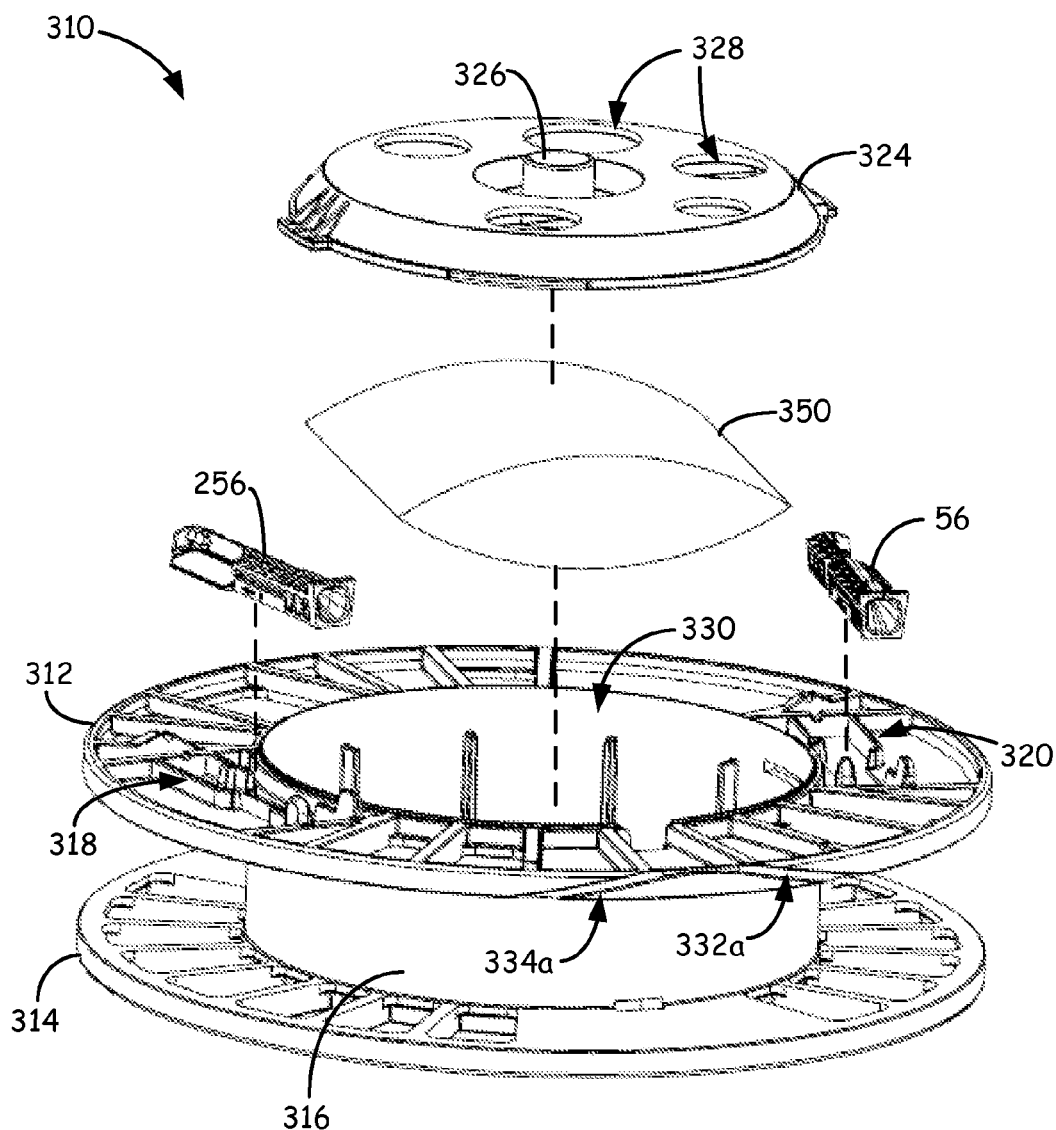
FIG. 15 is an exploded perspective view of the filament spool.

FIGS. 13-15 illustrate spool 310, which corresponds to spool 70 shown in FIG. 4, and is a suitable filament spool for use with containers 10 and 12. As shown in FIG. 13, spool 310 includes cover rim 312 and base rim 314, which are offset by axial shaft 316. Axial shaft 316 is the bearing surface for winding a modeling or support filament around spool 310.

Cover rim 312 includes guide mechanism slots 318 and 320, which are slots for respectively receiving filament guide mechanisms 256 and 56. Thus, a single spool 310 may be used for either retaining a modeling filament or a support filament, thereby reducing manufacturing costs by only requiring a single design to be fabricated. Furthermore, cover rim 312 may also include indicia (e.g., indicia 322) designating which filament guide mechanism is intended to be retained in each of guide mechanism slots 318 and 320. In one embodiment, guide mechanism slot 318 is designed to allow filament guide mechanism 256 to be mounted, but prevents filament guide mechanism 56 from being mounted. Correspondingly, guide mechanism slot 320 may be designed to allow filament guide mechanism 56 to be mounted, while preventing filament guide mechanism 256 from being mounted.

Spool 310 also includes central cap 324, which is desirably a removable cap that is securable to cover rim 312. Central cap 324 includes top hub 326, which desirably exhibits reciprocating dimensions to the dimensions of hub mount 36 of container 12 and a corresponding hub mount of container 10. Furthermore, top hub 326 desirably engages hub mount 36 in a low-friction manner, thereby allowing spool 310 to rotate with low frictional resistance. This allows spool 310 to rotate freely within containers 10 and 12, and is beneficial for reducing the risk of the disrupting or otherwise restricting the movement of the modeling or support filament.

In the embodiment shown, central cap 324 also includes a plurality of holes 328, which provide access to central chamber 330. Central chamber 330 is an open volume within axial shaft 316 that is capable of retaining one or more items, such as desiccant packages. The use of one or more desiccants allows spool 310 to reduce the moisture content of the modeling or support filament during storage and transportation via holes 328.

Spool 310 also includes filament grooves 332a-332d extending along a first portion of cover rim 312 and defining a pathway on the opposing side of cover rim 312 from axial shaft 316 that intersects guide mechanism slot 318, and filament grooves 334a-334d extending along a second portion of cover rim 312 and defining a pathway on the opposing side of cover rim 312 from axial shaft 316 that intersects guide mechanism slot 320. Filament grooves 332a and 334a extend across the lateral edge of cover rim 312 in a crisscross arrangement for directing a leading end of a either a modeling filament or a support filament. For example, in an embodiment in which spool 310 retains a supply of a modeling filament wound around axial shaft 316, the modeling filament is desirably wound around axial shaft 316 in the rotational direction of arrow 336. This allows the modeling filament to be fed from spool 310 to channel 258 of container 10 (shown in FIG. 12) by rotating spool 310 in the rotational direction of arrow 336.

In this embodiment, the leading end of the modeling filament may be guided through groove 332a, and along a path represented by arrow 338 in FIG. 13. Thus, the modeling filament may be inserted into groove 332b, through a filament guide mechanism (e.g., filament guide mechanism 256, not shown) mounted in guide mechanism slot 318, and into grooves 332c and 332d. This allows the leading end of the modeling filament to be restrained to cover rim 312, thereby substantially preventing the modeling filament from unwinding from spool 310 during transportation and storage. In one embodiment, one or more of grooves 332a-332d may exhibit dimensions that allow the modeling filament to be snapped into the given grooves to restrain the modeling filament against cover rim 312.

Alternatively, in an embodiment in which spool 310 retains a supply of a support filament wound around axial shaft 316, the support filament is desirably wound around axial shaft 316 in the rotational direction of arrow 340, which is the opposing rotational direction from the winding direction of the modeling material. This allows the support filament to be fed from spool 310 to channel 58 of container 12 (shown in FIGS. 2-5) by rotating spool 310 in the rotational direction of arrow 340. In this embodiment, the leading end of the support filament may be guided through groove 334a, and along a path represented by arrow 342 in FIG. 13. Thus, the support filament may be inserted into groove 334b, through a filament guide mechanism (e.g., filament guide mechanism 56, not shown) mounted in guide mechanism slot 320, and into grooves 334c and 334d. This allows the leading end of the support filament to be restrained to cover rim 312, thereby substantially preventing the support filament from unwinding from spool 310 during transportation and storage. In one embodiment, one or more of grooves 334a-334d may exhibit dimensions that allow the support filament to be snapped into the given grooves to restrain the support filament against cover rim 312.

The use of grooves 332a-332d and grooves 334a-334d with the spoked structure of cover rim 312 is beneficial for readily inserting and removing the filaments without requiring excessive force, while also restraining the filaments to cover rim 312 during storage and transportation. While spool 310 is illustrated with four grooves for each type of filament (i.e., grooves 332a-332d for the modeling filament, and grooves 334a-334d for the support filament), spool 310 may alternatively include a fewer number of grooves or a greater number of grooves for each type of filament.

In additional embodiments, spool 310 may designated for either a support filament or a modeling filament. In these embodiments, spool 310 may only include a single guide mechanism slot and corresponding series of grooves. For example, spool 310 may include guide mechanism slot 318 and grooves 332a-332d for retaining a modeling filament. A second spool 310 may then include a reciprocating geometry that includes guide mechanism slot 320 and grooves 334a-334d for retaining a support filament. Thus, spool 310 may tailored for use with both filaments (i.e., as shown in FIG. 13), or for use with a particular filament.

As shown in FIG. 14, spool 310 also includes base portion 344, which is the base of central chamber 330. Base portion 344 includes bottom hub 346, which is the opposing hub from hub 326 and desirably exhibits reciprocating dimensions to the dimensions hub mount 52 of container 12 and a corresponding hub mount of container 10. Furthermore, bottom hub 346 desirably engages hub mount 52 in a low-friction manner, thereby allowing spool 310 to rotate low frictional resistance. As discussed above, this allows spool 310 to rotate freely within containers 10 and 12, and is beneficial for reducing the risk of the disrupting or otherwise restricting the movement of the modeling or support filament. Base portion 344 also includes a plurality of holes 348, which provide additional access to central chamber 330.

As shown in FIG. 15, cap 324 may be removed to provide access to central chamber 330, in which desiccant package 350 may be retained. Additionally, one of filament guide mechanism 56 or filament guide mechanism 256 may be mounted in the respective guide mechanism slot 318 or 320. For example, while spool 310 retains a modeling filament, filament guide mechanism 256 may be mounted in guide mechanism slot 318, and the leading end of the modeling filament may be directed along grooves 332a-332d and through filament guide mechanism 256, as discussed above. This allows the modeling filament to be pre-inserted through filament guide mechanism 256 prior to use with container 10. This arrangement also restrains the leading end of the modeling filament to cover rim 312, thereby substantially preventing the modeling filament from unwinding during storage and transportation.

After the modeling filament is retained by one or more of grooves 332a-332d and filament guide mechanism 256, spool 310 may be sealed in a packaging for storage and transportation. The packaging may include a variety of properties, such as filament restraint and moisture resistance to prevent moisture from reaching the modeling or support filament. The use of a moisture-resistant package is particularly suitable for use with desiccant package 350 retained in central chamber 330. This allows desiccant package 350 to draw moisture from the modeling filament during storage.

Similarly, while spool 310 retains a support filament, filament guide mechanism 56 may be mounted in guide mechanism slot 320, and the leading end of the support filament may be directed along grooves 334a-334d and through filament guide mechanism 56, as discussed above. This allows the support filament to be pre-inserted through filament guide mechanism 56 prior to use with container 12. This arrangement also restrains the leading end of the support filament to cover rim 312, thereby substantially preventing the support filament from unwinding during storage and transportation. After the support filament is retained by one or more of grooves 334a-334d and filament guide mechanism 56 is mounted in guide mechanism slot 320, spool 310 may also be sealed in a packaging (e.g., moisture-resistant packaging) for storage and transportation.

Prior to performing a build operation with system 10, a first spool 310 containing the modeling filament may be unwrapped, and placed in container 10. Filament guide mechanism 256 may be removed from filament guide slot 318, and placed in channel 258 of container 10. As discussed above, this places filament guide mechanism 256 in signal communication with circuit board 246 of container 10. Container 10 may then be closed and locked with buckle locks 254, and loaded into loading bay 16a of system 14 for feeding the modeling filament to system 14. Correspondingly, a second spool 310 containing the support filament may be unwrapped, and placed in container 12. Filament guide mechanism 56 may be removed from filament guide slot 320, and placed in channel 58 of container 12. This places filament guide mechanism 56 in signal communication with circuit board 46 of container 12. Container 12 may then be closed and locked with buckle locks 54, and loaded into loading bay 16b of system 14 for feeding the support filament to system 14.

When the supply of modeling or support filament in containers 10 and 12 is exhausted, the remaining amount of modeling or support filament may be drawn back into the respective container 10 or 12. The container 10 or 12 may then be removed from loading bay 16a or 16b, and opened to remove spool 310. A new spool 310 may then be unwrapped and loaded into the container 10 or 12, as discussed above, for continued use in system 10. Accordingly, a single container 10 or 12 may be used with multiple interchangeable spools 310 for continued operation of system 14. The use of containers 10 and 12, and the corresponding spools (e.g., spools 70 and 310), provide an efficient arrangement for supplying modeling and support filaments to a digital manufacturing system (e.g., system 14), and for monitoring the usage of the modeling and support filaments during a build operation.

Figure 16:
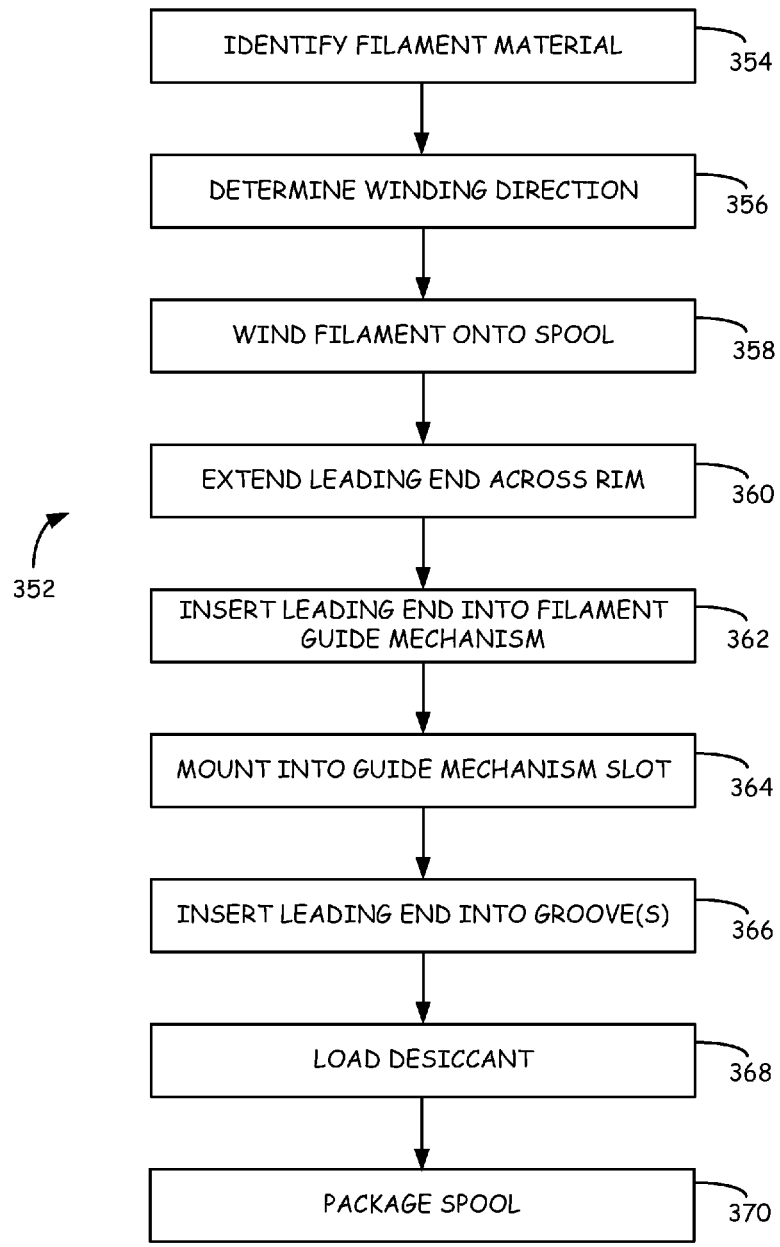
FIG. 16 is a flow diagram of a method for loading a filament into a filament spool.

FIG. 16 is a flow diagram of method 352 for loading a modeling or support filament onto a filament spool (e.g., filament spools 70 and 310). As shown, method 352 initially involves identify the material of the filament (e.g., a modeling material or a support material) (step 354). As discussed above, the modeling filament is desirably wound onto the filament spool in an opposing rotational direction from the winding direction of the support material, based on a common axis of rotation. This allows the respective spools to be used in containers 10 and 12. Accordingly, after the material of the filament is identified, the corresponding winding direction associated with the given material is determined (step 356), and the filament is wound onto the filament spool such that the wound filament extends around the axial shaft (e.g., axial shaft 316) in the same rotational direction (step 358). In one embodiment, the trailing end of the filament (i.e., the portion that is last to unwind from spool 310 during use) is desirably not secured to spool 310. This is beneficial for allowing the filament to entirely unwind from spool 310 during a build operation in container 10 or 12. This correspondingly allows the trailing end of the filament to pass the filament sensor of the filament guide mechanism retained in container 10 or 12.

When the desired amount of the filament is wound onto the spool, the leading end of the filament is extended across the rim through either groove 332a or groove 334a depending on the rotational direction of the filament (step 360). As used herein, the term "leading end" of a filament refers to a segment of the filament adjacent to the lead tip of the filament, and is not intended to be limited merely to the lead tip of the filament. The leading end may then be inserted at least partially into or through the corresponding filament guide mechanism (e.g, filament guide mechanism 256 for a modeling filament and filament guide mechanism 56 for a support filament) (step 362), and the filament guide mechanism may be mounted in the appropriate guide mechanism slot (e.g., guide mechanism slots 318 and 320) (step 364). In embodiments in which the circuit board of the filament guide mechanism (e.g., circuit board 144) contains non-volatile media for data storage of filament information, encryption, and/or driver protocols, such data is desirably preset prior to loading the filament to the filament spool.

The leading end may also be inserted into one or more of the grooves that define a pathway along the cover rim (e.g., grooves 332b-332d or grooves 334b-334d) (step 366), and the filament may be pulled until the spooled portion of the filament is tight. This reduces the risk of the filament unwinding during storage or transportation. Any excess portion of the leading end may be removed if necessary. The chamber cap of the filament spool (e.g., chamber cap 324) may be removed, and a desiccant may be loaded into the central chamber of the filament spool (step 368). The chamber cap may then be placed back over the central chamber, and the filament spool may be packaged for storage or transportation (e.g., shrink-wrap packaging) (step 370). Identifying the material of the filament and determining the corresponding winding direction for the filament, pursuant to steps 354 and 356, allow filament spools for the modeling filament and the support filament to be correspondingly unwound in the same rotational directions for use in containers 10 and 12. This reduces user confusion when loading the filament spools into containers 10 and 12, and prevents the incorrect spools from being loaded into system 14.

Although the present disclosure has been described with reference to preferred embodiments, workers skilled in the art will recognize that changes may be made in form and detail without departing from the spirit and scope of the disclosure.

The invention claimed is:

1. A method for loading a filament onto a filament spool for use in a digital manufacturing system, the method comprising:
   winding a first segment of the filament around an axial shaft of the filament spool in a first rotational direction, wherein the axial shaft is disposed between a first rim and a second rim, the first rim extending perpendicular to the axial shaft and comprising an inner side adjacent to the axial shaft, an outer side opposite of inner side, and a lateral edge offsetting the inner side and the outer side;
   extending a second segment of the filament in the first rotational direction from the inner side of the first rim, across a lateral groove extending from the inner side of the first rim to the outer side of the first rim, such that at least a portion of the second segment is inserted through the lateral groove;
   extending a third segment of the filament across the outer side of the first rim through at least one groove in the outer side of the first rim such that at least a portion of the third segment has an arcuate arrangement with a curve in the same direction as the first rotational direction; and
   restraining part of the third segment of the filament to the outer side of the first rim to maintain the arcuate arrangement in a manner that comprises at least one of snap fitting the third segment of the filament into at least one of the at least one groove in the outer side of the first rim, and inserting part of the third segment of the filament into a filament guide mechanism and mounting the filament guide mechanism on the outer side of the first rim.

2. The method of claim 1, wherein the at least one groove in the outer side of the first rim comprises a series of grooves.

3. The method of claim 1, wherein the lateral groove extends between the inner side of the first rim to the outer side of the first rim in a direction that is non-parallel to the axial shaft and non-parallel to the outer surface of the first rim.

4. The method of claim 1, wherein inserting the part of the third segment of the filament into the filament guide mechanism comprises inserting the part of the third segment of the filament at least partially through a filament pathway in the filament guide mechanism.

5. The method of claim 4, wherein mounting the filament guide mechanism on the outer side of the first rim comprises mounting the filament guide mechanism into a guide mechanism slot located on the outer side of the first rim.

6. The method of claim 4, and further comprising snap fitting the third segment of the filament into at least one of the at least one groove in the outer side of the first rim.

7. The method of claim 4, and further comprising engaging the part of the third segment of the filament with a filament-detection sensor retained by the filament guide mechanism.

8. A method for loading a filament onto a filament spool for use in a digital manufacturing system, the method comprising:
   winding a first segment of the filament around an axial shaft of the filament spool in a first rotational direction, wherein the axial shaft is disposed between a first rim and a second rim, the first rim extending perpendicular to the axial shaft and comprising an inner side adjacent to the axial shaft, an outer side opposite of inner side, and a lateral edge offsetting the inner side and the outer side;
   extending a second segment of the filament in the first rotational direction from the inner side of the first rim, across a lateral groove extending from the inner side of the first rim to the outer side of the first rim, such that at least a portion of the second segment is inserted through the lateral groove, wherein the lateral groove extends between the inner side of the first rim to the outer side of the first rim in a direction that is non-parallel to the axial shaft and non-parallel to the outer surface of the first rim; and
   extending a third segment of the filament across the outer side of the first rim through at least one groove in the outer side of the first rim such that at least a portion of the third segment has an arcuate arrangement with a curve in the same direction as the first rotational direction.

9. The method of claim 8, wherein the at least one groove in the outer side of the first rim comprises a series of grooves.

10. The method of claim 8, and further comprising restraining the part of the third segment of the filament to the outer side of the first rim.

11. The method of claim 10, wherein restraining the part of the third segment of the filament to the outer side of the first rim comprises inserting the part of the third segment of the filament into a filament guide mechanism.

12. The method of claim 11, and further comprising mounting the filament guide mechanism into a guide mechanism slot located on the outer side of the first rim.

13. The method of claim 11, and further comprising engaging the part of the third segment of the filament with a filament-detection sensor retained by the filament guide mechanism

14. The method of claim 12, wherein restraining the part of the third segment of the filament to the outer side of the first rim comprises snap fitting the third segment of the filament into at least one of the at least one groove in the outer side of the first rim.

* * * * *

UNITED STATES PATENT AND TRADEMARK OFFICE
CERTIFICATE OF CORRECTION

PATENT NO.        : 8,132,753 B2
APPLICATION NO.   : 13/079244
DATED             : March 13, 2012
INVENTOR(S)       : Taatjes et al.

Page 1 of 1

It is certified that error appears in the above-identified patent and that said Letters Patent is hereby corrected as shown below:

In the Claims:

Column 22
Claim 14, Line 3, delete "12" and insert -- 10 --

Signed and Sealed this
Twenty-fifth Day of February, 2014

Michelle K. Lee
*Deputy Director of the United States Patent and Trademark Office*